United States Patent
Iwaasa et al.

(10) Patent No.: US 11,680,817 B2
(45) Date of Patent: Jun. 20, 2023

(54) SURROUNDING INFORMATION COLLECTION SYSTEM AND SURROUNDING INFORMATION ACQUISITION APPARATUS

(71) Applicant: TOYOTA JIDOSHA KABUSHIKI KAISHA, Toyota (JP)

(72) Inventors: Shintaro Iwaasa, Toyota (JP); Takashi Kojima, Seto (JP); Naoki Yamamuro, Nagoya (JP); Masato Endo, Nagakute (JP); Daishi Terato, Nagoya (JP); Masakazu Nomura, Nagoya (JP); Shinichiro Fujii, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/511,830

(22) Filed: Oct. 27, 2021

(65) Prior Publication Data

US 2022/0049972 A1    Feb. 17, 2022

Related U.S. Application Data

(63) Continuation of application No. 16/838,600, filed on Apr. 2, 2020, now Pat. No. 11,441,922, which is a (Continued)

(30) Foreign Application Priority Data

Apr. 22, 2016 (JP) .................... 2016-086243

(51) Int. Cl.
*G06F 16/29* (2019.01)
*G01C 21/36* (2006.01)
(Continued)

(52) U.S. Cl.
CPC ..... *G01C 21/3691* (2013.01); *G01C 21/3848* (2020.08); *G05D 1/0274* (2013.01);
(Continued)

(58) Field of Classification Search
CPC .. G05D 1/0274; G05D 1/0285; G05D 1/0282; G05D 2201/0213; G06F 16/29; G01C 21/32; G01C 21/3691
(Continued)

(56) References Cited

U.S. PATENT DOCUMENTS 8,417,265 B2   4/2013 Kimishima
8,571,789 B2  10/2013 Monde et al.
(Continued)

FOREIGN PATENT DOCUMENTS

CN     105799640 B    6/2018
DE   102007003147 A1   9/2007
(Continued)

OTHER PUBLICATIONS

S. Hasirlioglu, A. Kamann, I. Doric and T. Brandmeier, "Test methodology for rain influence on automotive surround sensors," 2016 IEEE 19th International Conference on Intelligent Transportation Systems (ITSC), 2016, pp. 2242-2247, doi: 10.1109/ITSC.2016.7795918. (Year: 2016).*

(Continued)

*Primary Examiner* — Cuong H Nguyen
(74) *Attorney, Agent, or Firm* — Oliff PLC

(57) ABSTRACT

A surrounding information collection system requests a vehicle to transmit surrounding information, and stores the surrounding information transmitted from the vehicle in response to the request. The surrounding information collection system requests a vehicle to transmit surrounding information, the vehicle acquiring the surrounding informa-
(Continued)

tion having accuracy greater than a threshold calculated based on accuracy of the stored surrounding information.

18 Claims, 16 Drawing Sheets

Related U.S. Application Data continuation of application No. 15/443,481, filed on Feb. 27, 2017, now Pat. No. 10,876,855.

(51) Int. Cl.
G05D 1/02 (2020.01)
G01C 21/00 (2006.01)

(52) U.S. Cl.
CPC ......... *G05D 1/0282* (2013.01); *G05D 1/0285* (2013.01); *G06F 16/29* (2019.01); *G05D 2201/0213* (2013.01)

(58) Field of Classification Search
USPC ...................................................... 701/533
See application file for complete search history.

(56) References Cited

U.S. PATENT DOCUMENTS

| | | | |
|---|---|---|---|
| 9,896,089 B2 | 2/2018 | Styles et al. | |
| 10,106,154 B2 | 10/2018 | Nguyen Van et al. | |
| 10,876,855 B2* | 12/2020 | Iwaasa | G01C 21/3691 |
| 11,131,551 B2* | 9/2021 | Fujimoto | G01C 21/3881 |
| 11,255,974 B2 | 2/2022 | Choi et al. | |
| 11,269,579 B2* | 3/2022 | Fujii | G06F 3/1446 |
| 11,321,572 B2* | 5/2022 | Sano | G01C 21/30 |
| 11,441,922 B2* | 9/2022 | Iwaasa | G05D 1/0274 |
| 2006/0114151 A1 | 6/2006 | Iwami | |
| 2007/0102527 A1* | 5/2007 | Eubank | H04M 11/04 340/539.18 |
| 2007/0299606 A1 | 12/2007 | Fujimoto | |
| 2008/0009967 A1 | 1/2008 | Bruemmer | |
| 2010/0214149 A1 | 8/2010 | Kuhn | |
| 2011/0313259 A1 | 12/2011 | Hatakeyama et al. | |
| 2012/0173185 A1 | 7/2012 | Taylor et al. | |
| 2013/0279695 A1* | 10/2013 | Rubin | G08G 1/166 380/255 |
| 2014/0006176 A1 | 1/2014 | Gudlavenkatasiva et al. | |
| 2014/0136414 A1 | 5/2014 | Abhyanker | |
| 2014/0358944 A1 | 12/2014 | Brower, Jr. et al. | |
| 2015/0279212 A1 | 10/2015 | Otake | |
| 2016/0061612 A1 | 3/2016 | You et al. | |
| 2016/0161265 A1* | 6/2016 | Bagheri | G01S 13/89 701/450 |
| 2016/0167704 A1 | 6/2016 | Stein et al. | |
| 2017/0075962 A1 | 3/2017 | Hitchcock et al. | |
| 2017/0101092 A1 | 4/2017 | Nguyen Van et al. | |
| 2017/0212711 A1* | 7/2017 | Inoue | G06F 3/0611 |
| 2017/0291600 A1* | 10/2017 | Styles | F02D 41/021 |

FOREIGN PATENT DOCUMENTS

| | | | | |
|---|---|---|---|---|
| DE | 112013005455 T5 | 8/2015 | | |
| DE | 102014015073 A1 | 4/2016 | | |
| JP | 2007-213485 A | 8/2007 | | |
| JP | 2010-103945 A | 5/2010 | | |
| JP | 2012-221291 A | 11/2012 | | |
| JP | 2014-137743 A | 7/2014 | | |
| JP | 2014-153950 A | 8/2014 | | |
| JP | 2016-038715 A | 3/2016 | | |
| JP | WO2018/061084 | * | 4/2018 | G01C 21/30 |
| JP | 6428687 B2 | 11/2018 | | |
| KR | 101610502 B1 | 4/2016 | | |
| WO | PCT/JP2017/033622 | * | 9/2017 | G01C 21/32 |

OTHER PUBLICATIONS

T. -Y. Wei, Z. -L. Qiu, C. -P. Young and Y. -T. Lo, "Implementation of In-vehicle Multi-sensor Information Fusion Gateway for Cooperative Driving," 2011 Second International Conference on Intelligent Systems, Modelling and Simulation, 2011, pp. 19-24, doi: 10.1109/ISMS.2011.13. (Year: 2011).*
I. Baftiu, A. Pajaziti and K. C. Cheok, "Multi-mode surround view for ADAS vehicles," 2016 IEEE International Symposium on Robotics and Intelligent Sensors (IRIS), 2016, pp. 190-193, doi: 10.1109/IRIS.2016.8066089. (Year: 2016).*
N. Akai, T. Hirayama, L. Y. Morales, Y. Akagi, H. Liu and H. Murase, "Driving Behavior Modeling Based on Hidden Markov Models with Driver's Eye-Gaze Measurement and Ego-Vehicle Localization," IEEE Intelligent Vehicles Symposium (IV), Paris, France, 2019, pp. 949-956, doi: 10.1109/IVS.2019.8814287 (Year: 2019).*
Dec. 30, 2021 Office Action issued in U.S. Appl. No. 16/836,600.
Liuyuan Deng et al.: Restricted Deformable Convolution-Based Road Scene Semantic Segmentation Using Surround View Cameras; IEEE Transactions on Intelligent Transportation Systems; vol. 21, Issue: 10; Journal Article; Publisher: IEEE; (Year: 2020).
Abdellah El Mekki et al.; Improving Driver Identification for the Next-Generation of In-Vehicle Software Systems; IEEE Transactions on Vehicular Technology; vol. 68, Issue: 8; Journal Article; Publisher: IEEE (Year: 2019).
H. Dong et al., "Enhanced Eco-Approach Control of Connected Electric Vehicles at Signalized Intersection With Queue Discharge Prediction," in IEEE Transactions on Vehicular Technology, vol. 70, No. 6, pp. 5457-5469, Jun. 2021, doi: 10.1109/TVT.2021.3075480. (Year: 2021).
Shunchen Liu et al.; "Lane Change Scheduling for Autonomous Vehicle: A Prediction-and-Search Framework", KDD 21, Aug. 14-18, 2021, Virtual Event, Singapore. (Year: 2021).
Jun. 24, 2022 Notice of Allowance issued in U.S. Appl. No. 16/838,600.
Wang et al; "Emergency Light Detection in Tunnel Environment: an Efficient Method;" Institute of Industrial Science; pp. 628-632; 2011.
May 14, 2020 Office Action Issued in U.S. Appl. No. 15/443,481.
On predicting vehicle tracks; Xiaowen Gong; Sathiamoorthy Manoharan; Proceedings of 2011 IEEE Pacific Rim Conference on Communications, Computers and Signal Processing; IEEE Conference paper (Year: 2011).
Probabilistic framework for ego-lane determination; Abderrahim Kasmi; Dieumet Denis; Romuald Aufrere ; Roland Chapuis; 2019 I EEE Intelligent Vehicles Symposium (IV); I EEE Conference Paper (Year: 2019).
Cooperative positioning and radar sensor fusion for relative localization of vehicles; Fabian de Ponte Muller; Estefania Munoz Diaz ;Ibrahim Rashdan; 2016 I EEE Intelligent Vehicles Symposium (IV); IEEE Conference Paper (Year: 2016).
Opportunistic Radio Assisted Navigation for Autonomous Ground Vehicles; Hongkai Wen; Yiran Shen ; Sawas Papaioannou ;Winston Churchill; Niki Trigoni; Paul Newman; 2015 International Conference on Distributed Computing in Sensor Systerns;IEEE Conference Paper (Year: 2015).
Sep. 3, 2020 Notice of Allowance Issued in U.S. Appl. No. 15/443,481.
W. Xu et ai., "Internet of vehicles in big data era," in IEEE/CAA Journal of Automatica Sinica, vol. 5, No. 1, pp. 19-35, Jan. 2018, doi: 10.1109/JAS.2017.7510736 (Year: 2018).
Ting Li et al; A trustworthiness-based vehicular recruitment scheme for information collections in Distributed Networked Systems; from Information Sciences;vol. 545, Feb. 4, 2021, pp. 65-81 (Year: 2021).
Nov. 3, 2021 Office Action issued in U.S. Appl. No. 16/838,600.

* cited by examiner

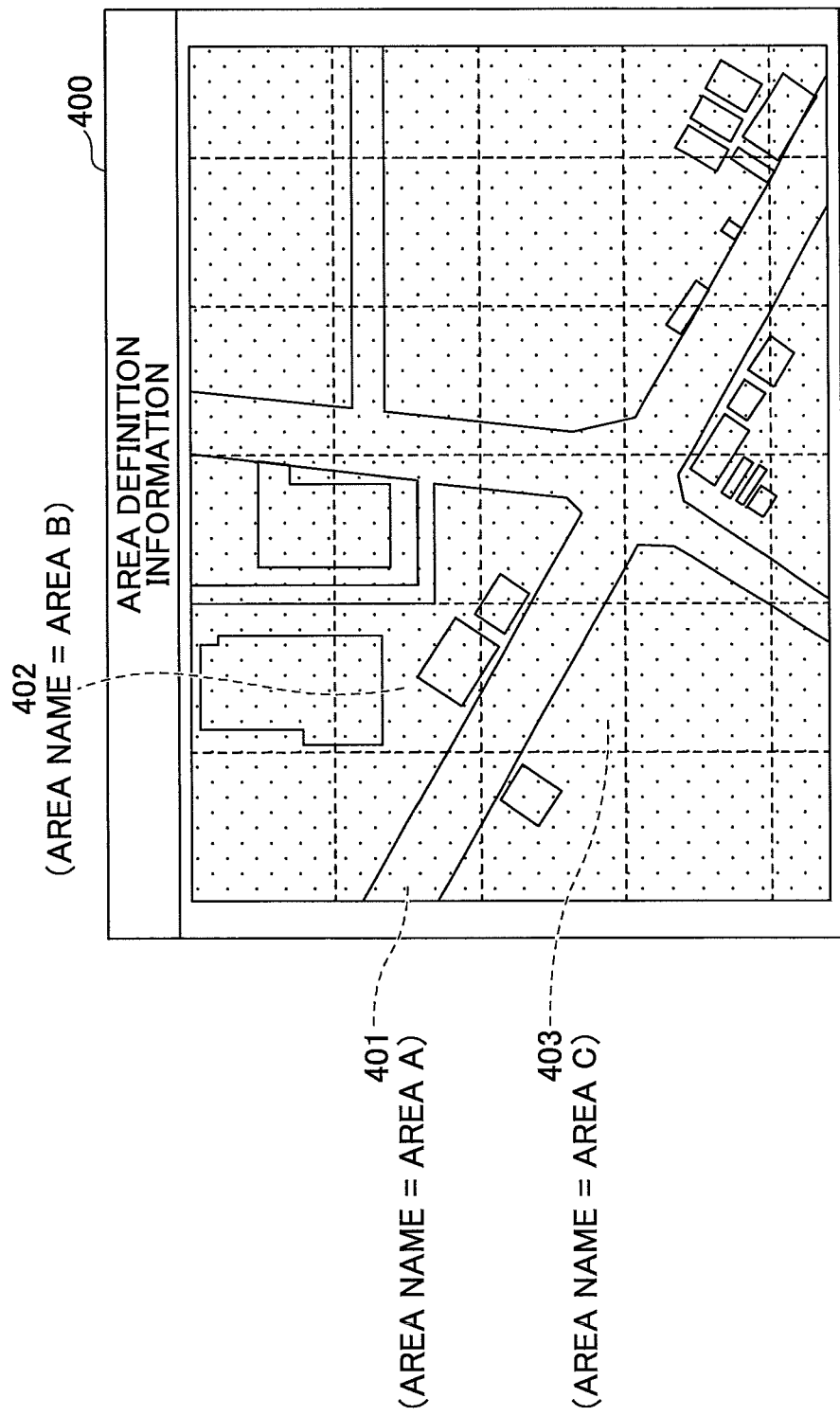

FIG.4B

| ACCURACY INFORMATION | INFORMATION INDICATING PRODUCT TYPE (PRODUCT NAME OR PRODUCT TYPE) |
|---|---|
| 7 | S01/2016, S05/2015 |
| 6 | S04/2015, S03/2015, S02/2015 |
| 5 | S01/2015, S03/2014 |
| 4 | S02/2014, S01/2014 |
| 3 | S01/2013 |
| 2 | S01/2012 |
| 1 | S01/2011, S01/2010 |

ACCURACY INFORMATION DEFINITION TABLE (SENSOR TYPE = 3D SCANNER APPARATUS) — 410

ACCURACY INFORMATION DEFINITION TABLE (SENSOR TYPE = IMAGING APPARATUS) — 420

ACCURACY INFORMATION DEFINITION TABLE (SENSOR TYPE = MILLIMETER-WAVE RADAR APPARATUS) — 430

FIG.5A

ACCURACY INFORMATION SETTING TABLE (VEHICLE ID = C1) 500

| INFORMATION INDICATING PRODUCT TYPE (PRODUCT NAME) | SENSOR TYPE | ACCURACY INFORMATION | TYPE INFORMATION |
|---|---|---|---|
| S05/2015 | 3D SCANNER APPARATUS | 7 | TARGET INFORMATION |
| IM01/2014 | IMAGING APPARATUS | 4 | IMAGE INFORMATION |
| L01/2013 | MILLIMETER-WAVE RADAR APPARATUS | 1 | DISTANCE INFORMATION |
| ... | ... | ... | ... |

FIG.5B

SURROUNDING INFORMATION RECORDING RESULT (VEHICLE ID = C1) 510

| TIME INFORMATION | POSITION INFORMATION (LATITUDE, LONGITUDE, ALTITUDE) | ACCURACY INFORMATION | TYPE INFORMATION | SURROUNDING INFORMATION |
|---|---|---|---|---|
| 2015/11/5 10:23 | (X11, Y11, Z11) | 7 | TARGET INFORMATION | 3D TARGET INFORMATION 1-001 |
| 2015/11/5 10:23 | (X11, Y11, Z11) | 4 | IMAGE INFORMATION | IMAGE INFORMATION 1-032 |
| 2015/11/5 10:24 | (X21, Y21, Z21) | 7 | TARGET INFORMATION | 3D TARGET INFORMATION 1-002 |
| 2015/11/5 10:27 | (X51, Y51, Z51) | 7 | TARGET INFORMATION | 3D TARGET INFORMATION 1-003 |
| ... | ... | ... | ... | ... |

FIG.6

601 / 611: AREA A(TYPE INFORMATION = TARGET INFORMATION) / AREA B(TYPE INFORMATION = TARGET INFORMATION)
602 / 612: AREA A(TYPE INFORMATION = IMAGE INFORMATION) / AREA B(TYPE INFORMATION = IMAGE INFORMATION)
603 / 613: AREA A(TYPE INFORMATION = DISTANCE INFORMATION) / AREA B(TYPE INFORMATION = DISTANCE INFORMATION)

| TIME INFORMATION | POSITION INFORMATION (LATITUDE, LONGITUDE, ALTITUDE) | ACCURACY INFORMATION | SURROUNDING INFORMATION | VEHICLE ID |
|---|---|---|---|---|
| 2015/11/5 10:23 | (X11, Y11, Z11) | 7 | 3D TARGET INFORMATION 1-001 | C1 |
| 2015/11/5 10:45 | (X12, Y12, Z12) | 4 | 3D TARGET INFORMATION 2-008 | C2 |
| 2015/11/5 10:48 | (X13, Y13, Z13) | 5 | 3D TARGET INFORMATION 3-004 | C3 |
| 2015/11/5 10:58 | (X14, Y14, Z14) | 2 | 3D TARGET INFORMATION 4-011 | C4 |
| ... | ... | ... | ... | ... |

| TIME INFORMATION | POSITION INFORMATION (LATITUDE, LONGITUDE, ALTITUDE) | ACCURACY INFORMATION | SURROUNDING INFORMATION | VEHICLE ID |
|---|---|---|---|---|
| 2015/11/5 10:24 | (X21, Y21, Z21) | 7 | 3D TARGET INFORMATION 1-002 | C1 |
| 2015/11/5 10:46 | (X22, Y22, Z22) | 4 | 3D TARGET INFORMATION 2-009 | C2 |
| 2015/11/5 10:49 | (X23, Y23, Z23) | 5 | 3D TARGET INFORMATION 3-005 | C3 |
| 2015/11/5 10:59 | (X24, Y24, Z24) | 2 | 3D TARGET INFORMATION 4-012 | C4 |
| ... | ... | ... | ... | ... |

FIG.13

| TIME INFORMATION | SURROUNDING INFORMATION RECORDING RESULT (VEHICLE ID = C1) 510 | | | | |
|---|---|---|---|---|---|
| | POSITION INFORMATION (LATITUDE, LONGITUDE, ALTITUDE) | INFORMATION INDICATING PRODUCT TYPE | ACCURACY INFORMATION | TYPE INFORMATION | SURROUNDING INFORMATION |
| AREA A | | | | | |
| AREA B | | | | | |
| AREA C | | | | | |
| AREA D | | | | | |
| AREA E | | | | | |

AREA A (TYPE INFORMATION = DISTANCE INFORMATION)
AREA A (TYPE INFORMATION = IMAGE INFORMATION)
AREA A (TYPE INFORMATION = TARGET INFORMATION)

| TIME INFORMATION | POSITION INFORMATION (LATITUDE, LONGITUDE, ALTITUDE) | ACCURACY INFORMATION | SURROUNDING INFORMATION | VEHICLE ID |
|---|---|---|---|---|
| 2015/11/5 10:23 | (X11, Y11, Z11) | 7 | 3D TARGET INFORMATION 1-001 | C1 |
| 2015/11/5 10:45 | (X12, Y12, Z12) | 4 | 3D TARGET INFORMATION 2-008 | C2 |
| 2015/11/5 10:48 | (X13, Y13, Z13) | 5 | 3D TARGET INFORMATION 3-004 | C3 |
| 2015/11/5 15:09 | (X15, Y15, Z15) | 7 | 3D TARGET INFORMATION 16-002 | C16 |
| ... | ... | ... | ... | ... |

611, 612, 613

AREA B (TYPE INFORMATION = DISTANCE INFORMATION)
AREA B (TYPE INFORMATION = IMAGE INFORMATION)
AREA B (TYPE INFORMATION = TARGET INFORMATION)

| TIME INFORMATION | POSITION INFORMATION (LATITUDE, LONGITUDE, ALTITUDE) | ACCURACY INFORMATION | SURROUNDING INFORMATION | VEHICLE ID |
|---|---|---|---|---|
| 2015/11/5 10:24 | (X21, Y21, Z21) | 7 | 3D TARGET INFORMATION 1-002 | C1 |
| 2015/11/5 10:46 | (X22, Y22, Z22) | 4 | 3D TARGET INFORMATION 2-009 | C2 |
| 2015/11/5 10:49 | (X23, Y23, Z23) | 5 | 3D TARGET INFORMATION 3-005 | C3 |
| 2015/11/5 15:10 | (X25, Y25, Z25) | 7 | 3D TARGET INFORMATION 16-002 | C16 |
| ... | ... | ... | ... | ... |

SURROUNDING INFORMATION COLLECTION SYSTEM AND SURROUNDING INFORMATION ACQUISITION APPARATUS

This application is a continuation application of U.S. patent application Ser. No. 16/838,600, filed on Apr. 2, 2021, which is a continuation application of U.S. patent application Ser. No. 15/443,481, filed Feb. 27, 2017, which claims priority to JP 2016-086243, filed Apr. 22, 2016. The disclosures of each application are hereby incorporated by reference in their entireties.

BACKGROUND

1. Technical Field

The present disclosure relates to a surrounding information collection system and a surrounding information acquisition apparatus.

2. Description of the Related Art

In order to implement automatic driving of a vehicle, it is required to establish a dynamic map with high accuracy and high freshness. A dynamic map is created from collecting various sets of surrounding information acquired at respective places where vehicles travel and their surroundings (3D (three-dimensional) information, landmark information, traffic rule information, and so forth), and is updated as required based on the latest surrounding information.

Surrounding information used to create and update a dynamic map can be collected, for example, by a vehicle management server that carries out communications with respective vehicles that actually travel at various places, and receives information acquired by the vehicles that are traveling, via a communications network.

Japanese Laid-Open Patent Application No. 2014-137743 discloses related art cases.

SUMMARY

According to one aspect of the present disclosure, a surrounding information collection system requests a vehicle to transmit surrounding information; and stores the surrounding information transmitted from the vehicle in response to the requesting. The surrounding information collection system requests a vehicle to transmit surrounding information, the vehicle acquiring the surrounding information having accuracy greater than a threshold calculated based on accuracy of the stored surrounding information.

Other objects, features and advantages will become more apparent from the following detailed description when read in conjunction with the accompanying drawings.

BRIEF DESCRIPTION OF THE DRAWINGS

FIG. 4A illustrates one example of area definition information schematically for the sake of simplifying the explanation;

FIG. 4B illustrates one example of accuracy information definition tables stored in an accuracy information definition table storage unit;

FIG. 5A illustrates one example of an accuracy information setting table;

FIG. 5B illustrates one example of a surrounding information recording result;

FIG. 6 illustrates one example of dynamic map information;

FIGS. 12-14 illustrate an actual example of the surrounding information collection process.

DETAILED DESCRIPTION OF EMBODIMENTS

Figure 1:
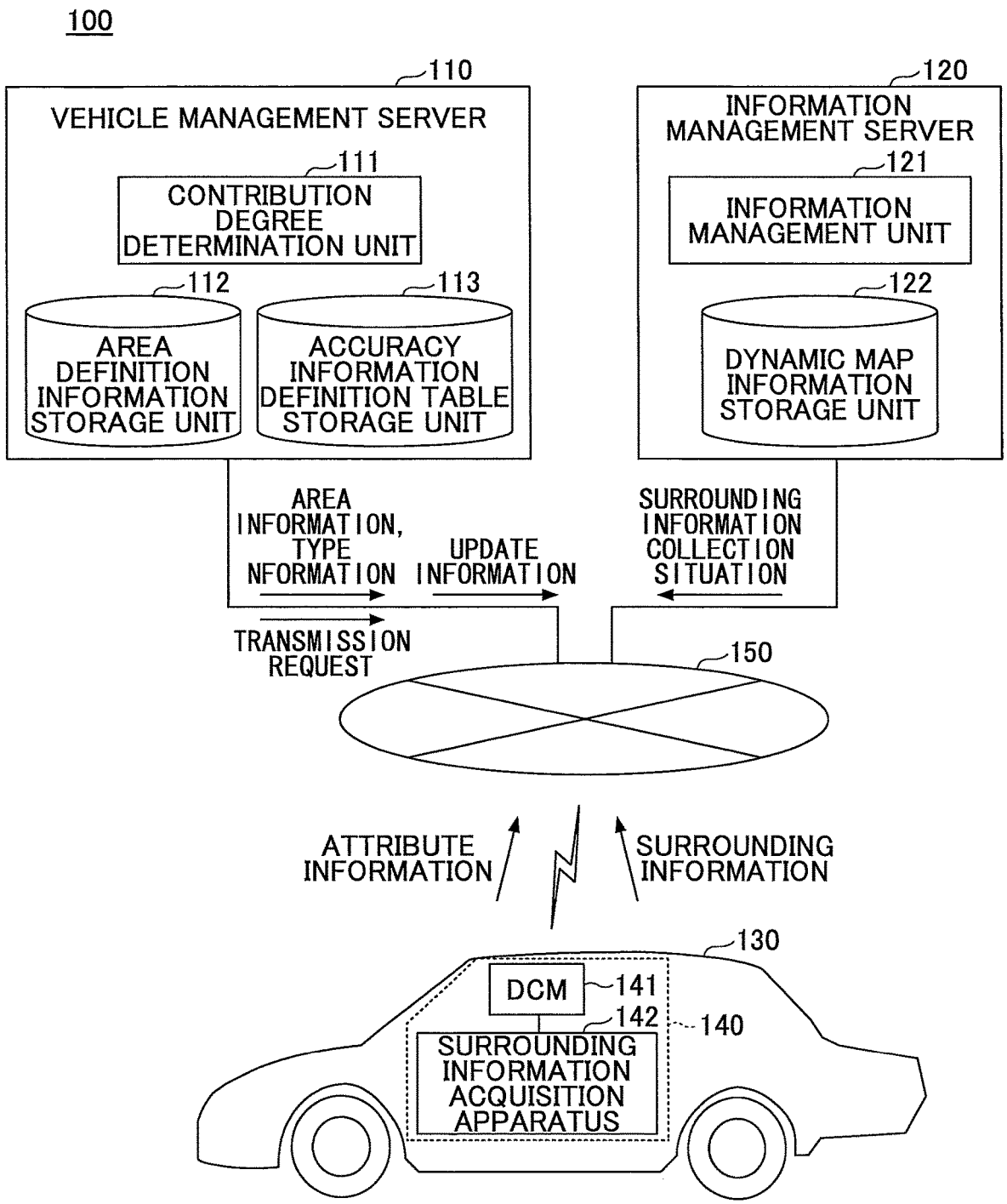
FIG. 1 illustrates one example of a system configuration of a surrounding information collection system.

If a vehicle management server receives all surrounding information acquired by vehicles that are traveling, the communications traffic required between the vehicles and the vehicle management server may be very high, in particular, in a traffic area such as a main road. As a result, the high communications cost may be required, and the communications network in the area may become congested.

Surrounding information acquired by vehicles that are traveling may include surrounding information with accuracy lower than accuracy of surrounding information that the vehicle management server has already collected. Such surrounding information may have a low contribution to creating and updating a dynamic map, and therefore, even if such surrounding information is not collected, creation and update of the dynamic map may be hardly affected.

Embodiments of the present invention have an object to limit targets to collect when collecting surrounding information acquired by vehicles via a communications network based on accuracy of surrounding information, to reduce communications traffic required to collect surrounding information.

Below, the embodiments of the present invention will be described with reference to the accompanying drawings. In the description of the embodiment below, a "sensor type" denotes a type of a surrounding information acquisition sensor installed in a vehicle to detect surrounding information at each place where the vehicle travels and the periphery of the place (for example, a 3D scanner apparatus, an imaging apparatus, a millimeter-wave radar apparatus, or the like). A "product type" denotes a type of a product that belongs to each sensor type of a surrounding information acquisition sensor (for example, a product name). "Type information" denotes information that indicates a type of surrounding information (for example, target information, image information, distance information, or the like).

"Accuracy information" denotes information that indicates accuracy of surrounding information, and is a value acquired by evaluating, on a scale of one through seven, accuracy of surrounding information detected by a product that belongs to each sensor type.

An "accuracy information definition table" denotes a table where products that belong to each sensor type are classified into seven groups according to the accuracy, and accuracy information 1 through 7 is associated with the respective groups. "Accuracy information=7" (i.e., accuracy information that indicates the highest accuracy) means that surrounding information detected by a product has the highest accuracy, and "accuracy information=1" (i.e., accuracy information that indicates the lowest accuracy) means that surrounding information detected by a product has the lowest accuracy.

An "accuracy information setting table" denotes a table where accuracy information of each of surrounding information acquisition sensors installed in each vehicle is set for a vehicle based on the accuracy information definition table. In the accuracy information setting table, information that indicates a product type, accuracy information, and type information of a surrounding information acquisition sensor installed in each vehicle are associated with each other.

A "contribution degree" denotes a degree of contribution at the present time for using peripheral information acquired through a surrounding information acquisition sensor to create or update a dynamic map. It is possible to calculate a contribution degree of surrounding information at the present time by correcting the accuracy information of the surrounding information detected by by a surrounding information acquisition sensor based on the elapsed time (freshness) from when the surrounding information was acquired. Note that, in the embodiments that will now be described, surrounding information contributes to creating or updating a dynamic map. However, a target (i.e., a use) to which surrounding information contributes need not be limited, and it is possible to use a term "serviceability" that indicates a utility value of surrounding information, instead of the term "contribution degree". The term "serviceability" has a broader meaning than the term "contribution degree".

Below, the embodiments will be described in detail. Note that, through the specification and drawings, the same reference numerals are given to elements that have substantially the same functional configurations, and duplicate description will be omitted.

[Embodiments]

<1. Configuration of Surrounding Information Collection System>

First, a system configuration of a surrounding information collection system according to an embodiment will be described. FIG. 1 illustrates one example of a system configuration of a surrounding information collection system. As illustrated in FIG. 1, the surrounding information collection system 100 includes a vehicle management server 110, an information management server 120, and a surrounding information acquisition system 140 installed in a vehicle 130.

In the surrounding information collection system 100, the vehicle management server 110 and the information management server 120 are communicatably connected via a network 150. In the same way, the vehicle management server 110 and the surrounding information acquisition system 140 are communicatably connected via the network 150.

The vehicle management server 110 is a server apparatus that manages the vehicle 130. In the present embodiment, a contribution degree determination program is installed in the vehicle management server 110. The vehicle management server 110 functions as a contribution determination unit 111 as a result of executing the contribution degree determination program.

If the contribution determination unit 111 has received attribution information (i.e., information that indicates an attribute of surrounding information that the vehicle 130 has acquired) from the vehicle 130, the contribution determination unit 111 determines, based on the received attribution information, whether to request the vehicle 130 to transmit the surrounding information. If the contribution determination unit 111 has determined to request the vehicle 130 to transmit the surrounding information, the contribution determination unit 111 requests the vehicle 130 to transmit the surrounding information, and receives the surrounding information from the vehicle 130. Also, the contribution determination unit 111 generates update information that includes the received surrounding information, and updates a dynamic map information storage unit 122. On the other hand, if the contribution determination unit 111 has determined to not request the vehicle 130 to transmit the surrounding information, the contribution determination unit 111 does not request the vehicle 130 to transmit the surrounding information.

When the contribution determination unit 111 determines whether to request the vehicle 130 to transmit the surrounding information, the contribution determination unit 111 reads an area definition information storage unit 112 based on position information (information that indicates the position where the vehicle 130 was when the vehicle acquired the surrounding information) included in the attribution information. Thus, the contribution determination unit 111 determines which one of previously defined areas (for example, respective blocks each having a size of 10 m by 10 m acquired from dividing each place where the vehicle 130 travels) corresponds to the position information included in the attribution information.

Then, the contribution determination unit 111 acquires information concerning a surrounding information collection situation from the information management server 120 based on area information that indicates the determined area and type information included in the attribution information.

Actually, the contribution determination unit 111 acquires the number of sets of surrounding information already stored in the dynamic map information storage unit 122 from the information management server 120. Note that the number of sets of surrounding information (hereinafter, also referred to as the number of stored sets) that the contribution determination unit 111 thus acquires is the number of sets of surrounding information to each of which the determined area information and the type information included in the attribution information are associated.

Also, the contribution determination unit 111 acquires the lowest contribution degree from among the contribution degrees of the respective sets of surrounding information already stored in the dynamic map information storage unit 122, from the information management server 120. Note that the lowest contribution degree that the contribution determination unit 111 thus acquires is the lowest contribution degree (hereinafter, referred to as the "contribution degree lowest value") from among the contribution degrees of the sets of surrounding information with each of which the determined area information and the type information included in the attribution information are associated.

Then, the contribution determination unit 111 determines whether to request the vehicle 130 to transmit the surrounding information, based on the information concerning the surrounding information collection situation (i.e., the number of stored sets and the contribution degree lowest value).

Note that when the contribution determination unit 111 determines whether to request the vehicle 130 to transmit the surrounding information based on the information concerning the surrounding information collection situation, the contribution determination unit 111 uses the accuracy information (i.e., the accuracy information of the surrounding information that the vehicle 130 acquires) included in the received attribution information. The accuracy information is determined based on an accuracy information setting table (not illustrated in FIG. 1) that is set in a surrounding information acquisition apparatus 142.

The information management server 120 is a server apparatus that manages the dynamic map information storage unit 122 that is one example of a storage unit that stores surrounding information. In the present embodiment, an information management program is installed in the information management server 120, and the information management server 120 functions as an information management unit 121 by executing the information management program.

If the information management unit 121 has received update information from the vehicle management server 110, the information management unit 121 updates the dynamic map information storage unit 122. Also, the information management unit 121 reads the dynamic map information storage unit 122 based on the area information and the type information transmitted from the vehicle management server 110, and determines the information concerning the surrounding information collection situation. Also, the information management unit 121 transmits the determined information concerning the surrounding information collection situation to the vehicle management server 110.

Actually, the information management unit 121 calculates the number of sets of surrounding information (the number of stored sets) associated with the area information and the type information transmitted from the vehicle management server 110 from among the sets of surrounding information already stored in the dynamic map information storage unit 122. Also, the information management unit 121 transmits the calculated number of stored sets to the vehicle management server 110.

Also, the information management unit 121 calculates the respective contribution degrees of the sets of surrounding information associated with the area information and the type information transmitted from the vehicle management server 110 from among the sets of surrounding information already stored in the dynamic map information storage unit 122. Also, the information management unit 121 transmits the lowest contribution degree (the contribution degree lowest value) from among the calculated contribution degrees to the vehicle management server 110.

The surrounding information acquisition system 140 has a DCM 141 and the surrounding information acquisition apparatus 142. The DCM 141 is a communications apparatus that connects to the vehicle management server 110 via the network 150.

The surrounding information acquisition apparatus 142 acquires surrounding information through a surrounding information acquisition sensor. Also, if the surrounding information acquisition apparatus 142 has acquired surrounding information, the surrounding information acquisition apparatus 142 transmits the attribution information to the vehicle management server 110. Also, if the surrounding information acquisition apparatus 142 has received a request from the vehicle management server 110 to transmit surrounding information, the surrounding information acquisition apparatus 142 transmits the requested surrounding information to the vehicle management server 110. Note that, a configuration of the surrounding information acquisition apparatus 142 will be described in detail with reference to FIG. 2.

<2. System Configuration of Surrounding Information Acquisition Apparatus>

Figure 2:
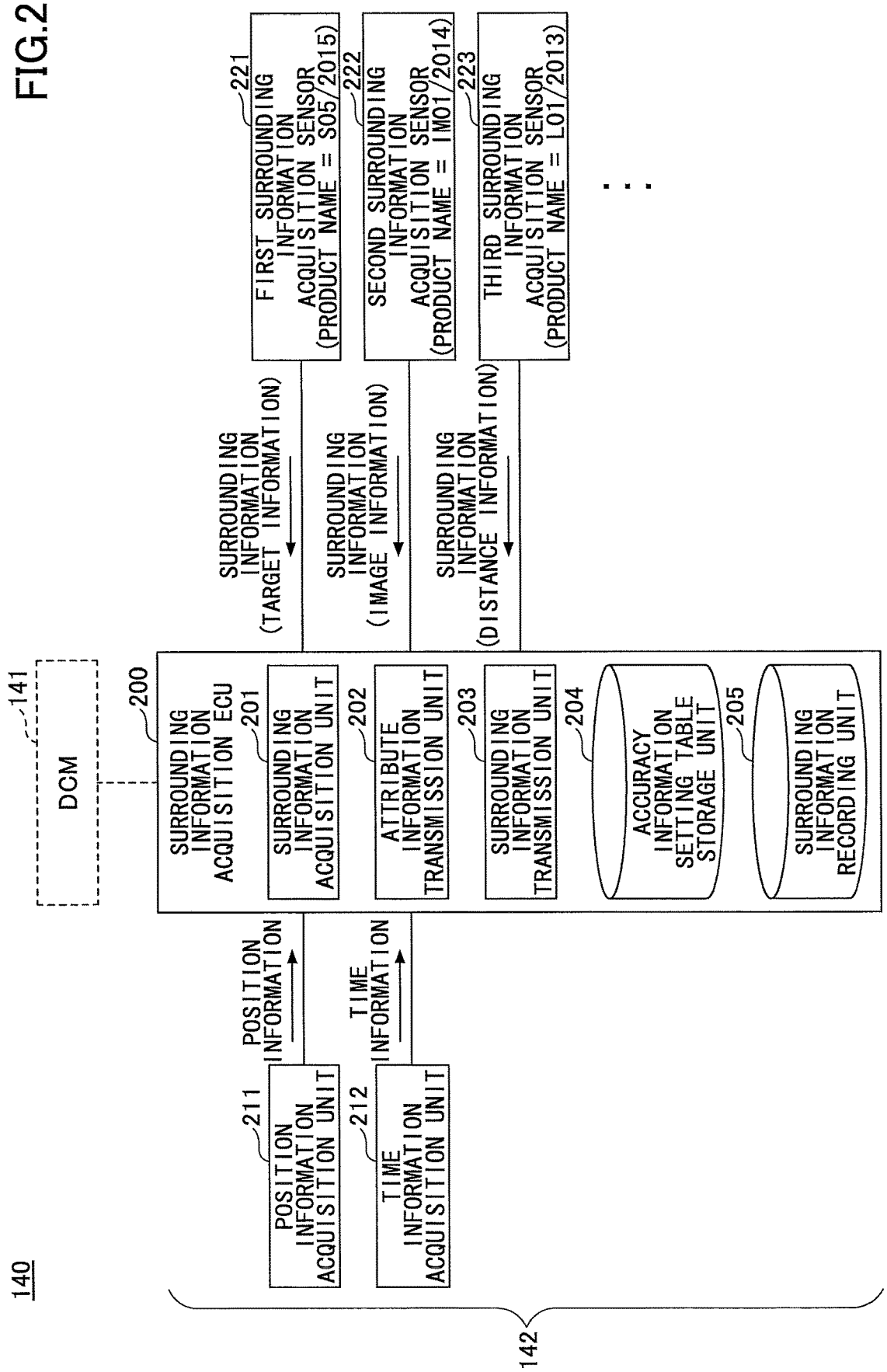
FIG. 2 illustrates one example of a system configuration of a surrounding information acquisition apparatus.

FIG. 2 illustrates one example of a system configuration of the surrounding information acquisition apparatus. As illustrated in FIG. 2, the surrounding information acquisition apparatus 142 includes a position information acquisition unit 211, a time information acquisition unit 212, and a surrounding information acquisition ECU 200. Also, the surrounding information acquisition apparatus 142 includes a first surrounding information acquisition sensor 221, a second surrounding information acquisition sensor 222, a third surrounding information acquisition sensor 223, and so forth.

The position information acquisition unit 211 calculates position information (the latitude, the longitude, and the altitude) that indicates the current position of the vehicle 130 based on, for example, information acquired from GPS (Global Positioning System). The position information acquisition unit 211 outputs the calculated position information to the surrounding information acquisition ECU 200.

The time information acquisition unit 212 acquires time information through, for example, a clock function built in the time information acquisition unit 212, and outputs the time information to the surrounding information acquisition ECU 200.

The first, second, and third surrounding information acquisition sensors 221, 222, and 223 are sensors that detect surrounding information at respective places where the vehicle 130 travels, and their surrounding places. The first surrounding information acquisition sensor 221 is, for example, a 3D scanner apparatus (i.e., a product name: "S05/2015"), and outputs detected target information to the surrounding information acquisition ECU 200 as surrounding information. The second surrounding information acquisition sensor 222 is, for example, an imaging apparatus (i.e., product name: "IM01/2014"), and outputs detected image information to the surrounding information acquisition ECU 200 as surrounding information. The third surrounding information acquisition sensor 223 is, for example, a millimeter-wave radar apparatus (i.e., product name: "L01/2013"), and outputs detected distance information to the surrounding information acquisition ECU 200 as surrounding information.

Note that surrounding information includes information that indicates the product type of the surrounding information acquisition sensor that outputs the surrounding information (for example, the product name).

In the surrounding information acquisition ECU 200, a surrounding information acquisition program, an attribution information transmission program, and a surrounding information transmission program are installed. The surrounding information acquisition ECU 200 executes the surrounding information acquisition program, the attribution information transmission program, and the surrounding information transmission program, to function as a surrounding information acquisition unit 201, an attribution information transmission unit 202, and a surrounding information transmission unit 203.

The surrounding information acquisition unit 201 is one example of an acquisition unit, and acquires surrounding information that is output from the first, second and third surrounding information acquisition sensors 221, 222, 223, and so forth. Also, the surrounding information acquisition unit 201 associates the acquired surrounding information with the position information acquired from the position information acquisition unit 211 and the time information acquired from the time information acquisition unit 212, and records the surrounding information, the position information, and the time information in a surrounding information recording unit 205.

Also, the surrounding information acquisition unit 201 reads an accuracy information setting table storage unit 204 to determine the accuracy information of the acquired surrounding information. Also, the surrounding information acquisition unit 201 associates the determined accuracy information with the acquired surrounding information, and records the accuracy information in the surrounding information recording unit 205.

Also, the surrounding information acquisition unit 201 reads the accuracy information setting table storage unit 204 to determine the type information of the acquired surrounding information. Also, the surrounding information acquisition unit 201 associates the determined type information with the acquired surrounding information, and records the type information in the surrounding information recording unit 205.

If the surrounding information is recorded in the surrounding information recording unit 205, the attribution information transmission unit 202 reads the also recorded position information, time information, accuracy information, and type information associated with the surrounding information, to generate the attribution information.

Also, the attribution information transmission unit 202 transmits the generated attribution information to the vehicle management server 110 via the DCM 141.

Also, the attribution information transmission unit 202 determines whether the attribution information transmission unit 202 has received a request to transmit the surrounding information within a predetermined period of time from when the attribution information transmission unit 202 transmitted the attribution information to the vehicle management server 110. If the attribution information transmission unit 202 has determined that the attribution information transmission unit 202 has received a request to transmit the surrounding information within the predetermined period of time, the attribution information transmission unit 202 transmits the determination result to the surrounding information transmission unit 203. On the other hand, if the attribution information transmission unit 202 has determined that the attribution information transmission unit 202 has not received a request to transmit the surrounding information within the predetermined period of time, the attribution information transmission unit 202 discards the surrounding information (for which a request to transmit has not been received) recorded in the surrounding information recording unit 205, and transmits a request invalid response to the vehicle management server 110.

If the surrounding information transmission unit 203 has received the determination result from the attribution information transmission unit 202, the surrounding information transmission unit 203 reads the corresponding surrounding information recorded in the surrounding information recording unit 205. Also, the surrounding information transmission unit 203 transmits a vehicle ID to identify the vehicle 130 and the read surrounding information to the vehicle management server 110 via the DCM 141. If the surrounding information transmission unit 203 has not received the determination result from the attribution information transmission unit 202, the surrounding information transmission unit 203 does not transmit the surrounding information to the vehicle management server 110.

<3. Hardware Configuration of Vehicle Management Server and Information Management Server, and Hardware Configuration of Surrounding Information Acquisition ECU>

Figure 3A:
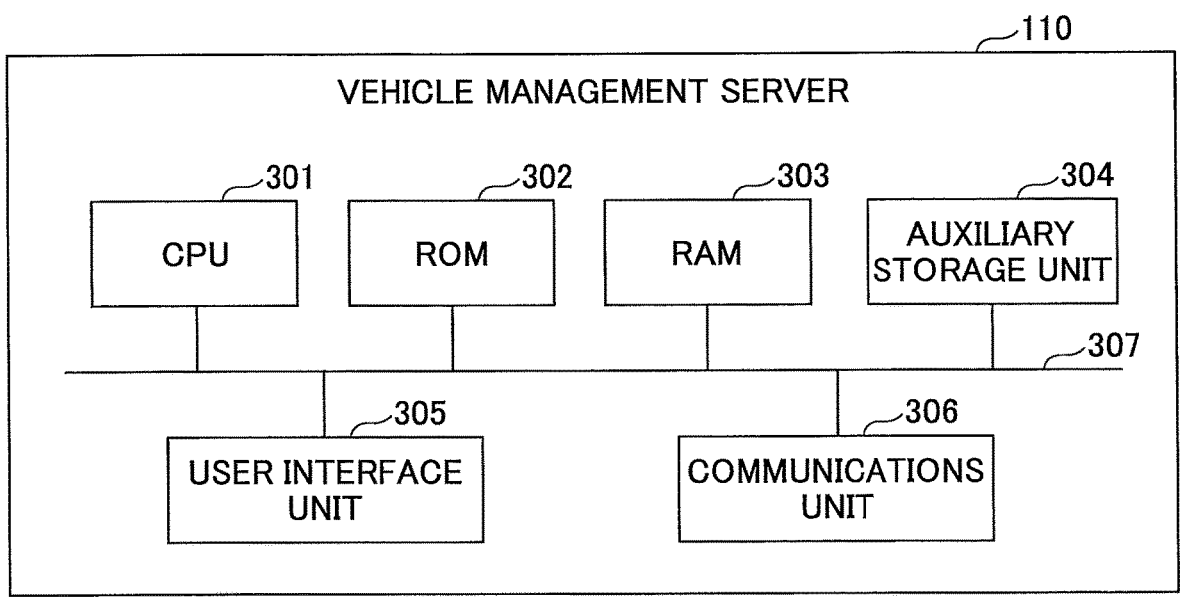
FIG. 3A illustrates one example of a hardware configuration of a vehicle management server and an information management server.

Next, hardware configurations of the vehicle management server 110 and the information management server 120 and a hardware configuration of the surrounding information acquisition ECU 200 will be described. Note that because hardware configurations of the vehicle management server 110 and the information management server 120 are approximately the same as one another, the hardware configuration of the vehicle management server 110 will now be described. FIG. 3A illustrates one example of a hardware configuration of the vehicle management server.

As illustrated in FIG. 3A, the vehicle management server 110 includes a CPU (Central Processing Unit) 301, a ROM (Read-Only Memory) 302, a RAM (Random Access Memory) 303, an auxiliary storage unit 304, a user interface unit 305, and a communications unit 306. The respective units in the vehicle management server 110 are mutually connected via a bus 307.

The CPU 301 is a processor that executes a program stored in the ROM 304 and a program (such as the contribution degree determination program) stored in the auxiliary storage unit 304. For executing a program, the CPU 301 uses information (area definition information, the accuracy information definition table, or the like) stored in the auxiliary storage unit 304.

The user interface unit 305 is used for inputting other information used by the CPU 301 for executing a program, and displays information generated when the CPU 301 has executed the program.

The communications unit 306 connects to the network 150, and carries out communications with respective apparatuses (the information management server 120 and the surrounding information acquisition system 140) via the network 150.

Figure 3B:
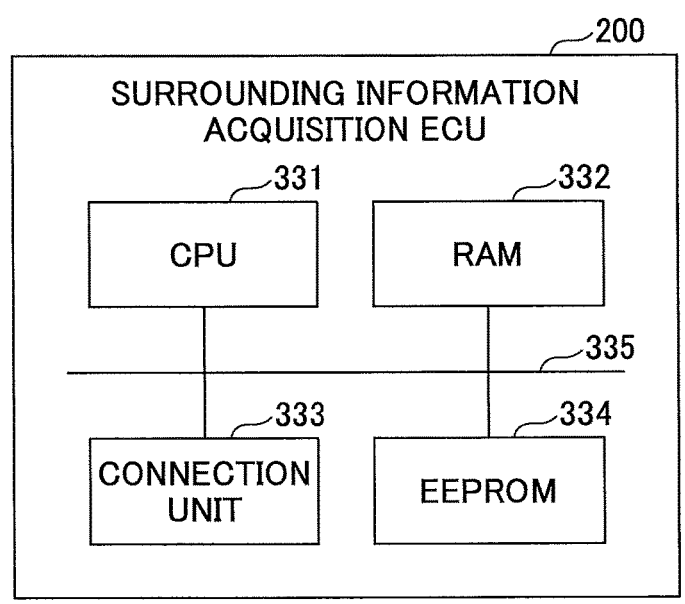
FIG. 3B illustrates one example of a hardware configuration of a surrounding information acquisition ECU.

FIG. 3B illustrates one example of a hardware configuration of the surrounding information acquisition ECU 200. As illustrated in FIG. 3B, the surrounding information acquisition ECU 200 includes a CPU 331, a RAM 332, a connection unit 333, and an EEPROM (Electrically Erasable Programmable Read-Only Memory) 334. The CPU 331 executes the surrounding information acquisition program, the attribution information transmission program, and the surrounding information transmission program stored in the EEPROM 334 using the RAM 332 or the like as a work area. The CPU 331 reads the accuracy information setting table storage unit 204 in the EEPROM 334 when executing these programs. Also, surrounding information and so forth acquired as a result of the CPU 331 executing these programs are recorded in the surrounding information recording unit 205 stored in the EEPROM 334.

The connection unit 333 connects the respective units (the position information acquisition unit 211, the time information acquisition unit 212, the first surrounding information acquisition sensors 221-223, the DCM 141, and so forth).

<4. Area Definition Information and Accuracy Information Definition Table in Vehicle Management Server>

Next, the area definition information stored in the area definition information storage unit 112, and the accuracy information definition table stored in the accuracy information definition table storage unit 113 in the vehicle management server 110, will be described. FIG. 4A illustrates one example of the area definition information schematically for the sake of simplifying the explanation.

As illustrated in FIG. 4A, the area definition information 400 is such that each area where the vehicle 130 travels is divided into, for example, square blocks each having a size of 10 m by 10 m, an area name is given to each block, and a relation between the position and the area is prescribed. Concerning the example of FIG. 4A, as illustrated, "area name=area A" is given to a block 401 representing a certain position in an actual space; "area name=area B" is given to a block 402 representing another position in the actual space; and "area name=area C" is given to a block 403 representing yet another position in the actual space.

By reading the area definition information 400 described above, the contribution determination unit 111 can determine the area corresponding to the position information concerning the vehicle 130 that is traveling.

FIG. 4B illustrates one example of the accuracy information definition tables stored in the accuracy information definition table storage unit 113. As illustrated in FIG. 4B, the accuracy information definition table storage unit 113 stores the accuracy information definition tables separately for the respective sensor types. The accuracy information definition table 410 is an accuracy information definition table for "sensor type=3D scanner apparatus" where the product types of products classified as 3D scanner apparatuses are further classified into seven groups according to the accuracy.

The accuracy information definition table 410 includes, as information items, "accuracy information" and "information indicating product type". As the item "accuracy information", accuracy information of any one of the seven grades 1-7 is stored. As the item "information indicating product type", a product name (or a product type) of each product is stored as information that indicates a product type classified as a 3D scanner apparatus and is associated with the corresponding accuracy information.

In the same way, the accuracy information definition table 420 is an accuracy information definition table for "sensor type=imaging apparatus" where the product types of products classified as imaging apparatuses are further classified into seven groups according to the accuracy. The accuracy information definition table 430 is an accuracy information definition table for "sensor type=millimeter-wave radar apparatus" where the product types of products classified as millimeter-wave radar apparatuses are further classified into seven groups according to the accuracy.

<5. Accuracy Information Setting Table and Surrounding Information Recording Result in Surrounding Information Acquisition ECU>

Next, the accuracy information setting table stored in the accuracy information setting table storage unit 204, and the surrounding information recording result stored in the surrounding information recording unit 205, in the surrounding information acquisition ECU 200, will be described. FIGS. 5A and 5B illustrate examples of the accuracy information setting table and the surrounding information recording result, respectively.

The accuracy information setting table 500 is generated based on the accuracy information definition tables 410-430, and so forth, of FIG. 4B, and is set for each vehicle. The example of FIG. 5A is the accuracy information setting table that is set for the vehicle 130 of "vehicle ID=C1".

As illustrated in FIG. 5A, the accuracy information setting table 500 prescribes the sensor types, the accuracy information, and the type information for all the surrounding information acquisition sensors installed in the vehicle 130. Therefore, the accuracy information setting table 500 has, as information items, "information indicating product type", "sensor type", "accuracy information", and "type information".

In the item "information indicating product type", the information indicating the product types (product names) of all the surrounding information acquisition sensors installed in the vehicle 130 of "vehicle ID=C1" is included. According to the example of FIG. 5A, the vehicle 130 of "vehicle ID=C1" has the surrounding information acquisition sensors of "product name=S05/2015", "product name=IM01/2014", and "product name=L01/2013".

In the item "sensor type", the sensor types of the respective surrounding information acquisition sensors are stored. In the item "accuracy information", the accuracy information concerning the surrounding information detected by each surrounding information acquisition sensor is stored. In the item "type information", the type information concerning the surrounding information detected by each surrounding information acquisition sensor is stored.

According to the example of FIG. 5A, the first surrounding information acquisition sensor 221 of "product name=S05/2015" is a 3D scanner apparatus that detects target information having the highest accuracy ("accuracy information=7") from among 3D scanner apparatuses that detect target information. Also, the second surrounding information acquisition sensor 222 of "product name=IM01/2014" is an imaging apparatus that detects image information having the fourth accuracy ("accuracy information=4") from among imaging apparatuses that detect image information. Also, the third surrounding information acquisition sensor 223 of "product name=L01/2013" is a millimeter-wave radar apparatus that detects distance information having the lowest accuracy ("accuracy information=1") from among millimeter-wave radar apparatuses that detect distance information.

Note that the accuracy information stored in the item "the accuracy information" of the accuracy information setting table 500 may be changed with time. For example, the first surrounding information acquisition sensor 221 of "product name=S05/2015" is a 3D scanner apparatus that detects target information of the highest accuracy at the present time from among the 3D scanner apparatuses included in the vehicle, according to the accuracy information definition table 410. However, for example, if a new 3D scanner apparatus that detects target information of higher accuracy ("accuracy information=7") has been included in the vehicle, the accuracy information definition table 410 of FIG. 4B will be changed. As a result, the accuracy of target information detected by the first surrounding information acquisition sensor 221 is relatively reduced accordingly. Thus, with time, the accuracy information definition table 410 of FIG. 4B may be changed, and therefore, it is desirable that also the accuracy information stored in the item "the accuracy information" of the accuracy information setting table 500 of FIG. 5 may be changed with time.

Next, the surrounding information recording result 510 will be described. As illustrated in FIG. 5B, the surrounding information recording result 510 is recorded, is associated with the vehicle ID, and, as information items, "time information", "position information", "accuracy information", "type information", and "surrounding information" are included.

In the item "time information", time information that indicates the time when the corresponding surrounding information was recorded in the surrounding information recording unit 205 is recorded. In the item "position information", position information that indicates the position where the surrounding information was recorded in the surrounding information recording unit 205 is recorded.

In the item "accuracy information", the accuracy information of the corresponding surrounding information is recorded. The accuracy information is determined by reading the accuracy information setting table 500. In the item "type information", the type information of the corresponding surrounding information is recorded. The type information is determined by reading the accuracy information setting table 500. In the item "surrounding information", the corresponding acquired surrounding information is recorded.

According to the example of FIG. 5B, the vehicle 130 identified by "vehicle ID=C1" recorded the surrounding information at a time of "time information=2015/11/5 10:23" (i.e., 10:23 on Nov. 5, 2015) at a place of position information=(X11, Y11, Z11). Also, according to the example of FIG. 5B, the recorded surrounding information has the accuracy of "accuracy information=7", has data name "3D target information 1-001", and belongs to "type information=target information". Note that, in FIG. 5B, the data name (for example, "3D target information 1-001") of each set of surrounding information is mentioned in the item "surrounding information" for the sake of simplifying the explanation. Actually, in the item "surrounding information", the corresponding set of surrounding information itself is stored.

<6. Dynamic Map Information of Information Management Server>

Next, the dynamic map information stored in the dynamic map information storage unit 122 of the information management server 120 will be described. FIG. 6 illustrates one example of the dynamic map information.

As illustrated in FIG. 6, in the dynamic map information storage unit 122, the dynamic map information is managed for each area name, and is classified for each type information. In FIG. 6, the dynamic map information 601 is dynamic map information for "area name=area A" and "type information=target information". In the same way, the dynamic map information 602 is dynamic map information for "area name=area A" and "type information=image information". The dynamic map information 603 is dynamic map information for "area name=area A" and "type information=distance information".

In the same way, the dynamic map information 611 is dynamic map information for "area name=area B" and "type information=target information". The dynamic map information 612 is dynamic map information for "area name=area B and "type information=image information". The dynamic map information 613 is dynamic map information for "area name=area B" and "type information=distance information".

Thus, the dynamic map information storage unit 122 has the number of sets of dynamic map information corresponding to the number of respective items of type information for each area.

Each of the respective sets of dynamic map information (601 through 603, and 611 through 613) has, as information items, "time information", "position information", "accuracy information", "surrounding information", and "vehicle ID".

In the item "time information", the time information included in the update information transmitted from the vehicle management server 110 is stored. Note that the time information included in the update information indicates the time when surrounding information detected by a surrounding information acquisition sensor was recorded in the surrounding information recording unit 205.

In the item "position information", the position information included in the update information transmitted from the vehicle management server 110 is stored. Note that the position information included in the update information indicates the position of the corresponding vehicle where the surrounding information detected by the surrounding information acquisition sensor was recorded in the surrounding information recording unit 205.

In the item "accuracy information", the accuracy information included in the update information transmitted from the vehicle management server 110 is stored. Note that the accuracy information included in the update information indicates the accuracy of the surrounding information detected by the surrounding information acquisition sensor.

In the item "surrounding information", the surrounding information included in the update information transmitted from the vehicle management server 110 is stored. In the item "vehicle ID", the identifier (ID) of the vehicle included in the update information transmitted from the vehicle management server 110 is stored.

Thus, in each of the respective sets of dynamic map information (601 through 603, and 611 through 613) stored in the dynamic map information storage unit 122, the time information, the position information, the accuracy information, and the vehicle ID are associated with the surrounding information, and are stored. According to the first record in the example of the dynamic map information 601, surrounding information (data name "3Dtarget information 1-001") was recorded at the time of "time information=2015/11/5 10:23" (i.e., 10:23 on Nov. 5, 2015) at the place of position information=(X11, Y11, Z11) included in the area A. Also, according to the first record in the example of the dynamic map information 601, the surrounding information has the accuracy of "accuracy information=7", and was transmitted from the vehicle 130 identified by "vehicle ID=C1".

According to the first record in the example of the dynamic map information 611, the vehicle 130 identified by "vehicle ID=C1" moved to the place of "position information=(X21, Y21, Z21)" included in the area B, 1 minute later (i.e., "time information=2015/11/5 10:24") (i.e., 10:24 on Nov. 5, 2015). Also, according to the first record in the example of the dynamic map information 611, the same vehicle 130 acquired surrounding information (data name "3D target information 1-002") having the accuracy of "accuracy information=7".

Note that, also in FIG. 6, the data name (for example, "3D target information 1-001") of each set of surrounding information is mentioned in the item "surrounding information" for the sake of simplifying the explanation. Actually, in the item "surrounding information", the corresponding set of surrounding information itself is stored.

<7. Functional Configuration of Vehicle Management Server>

Figure 7:
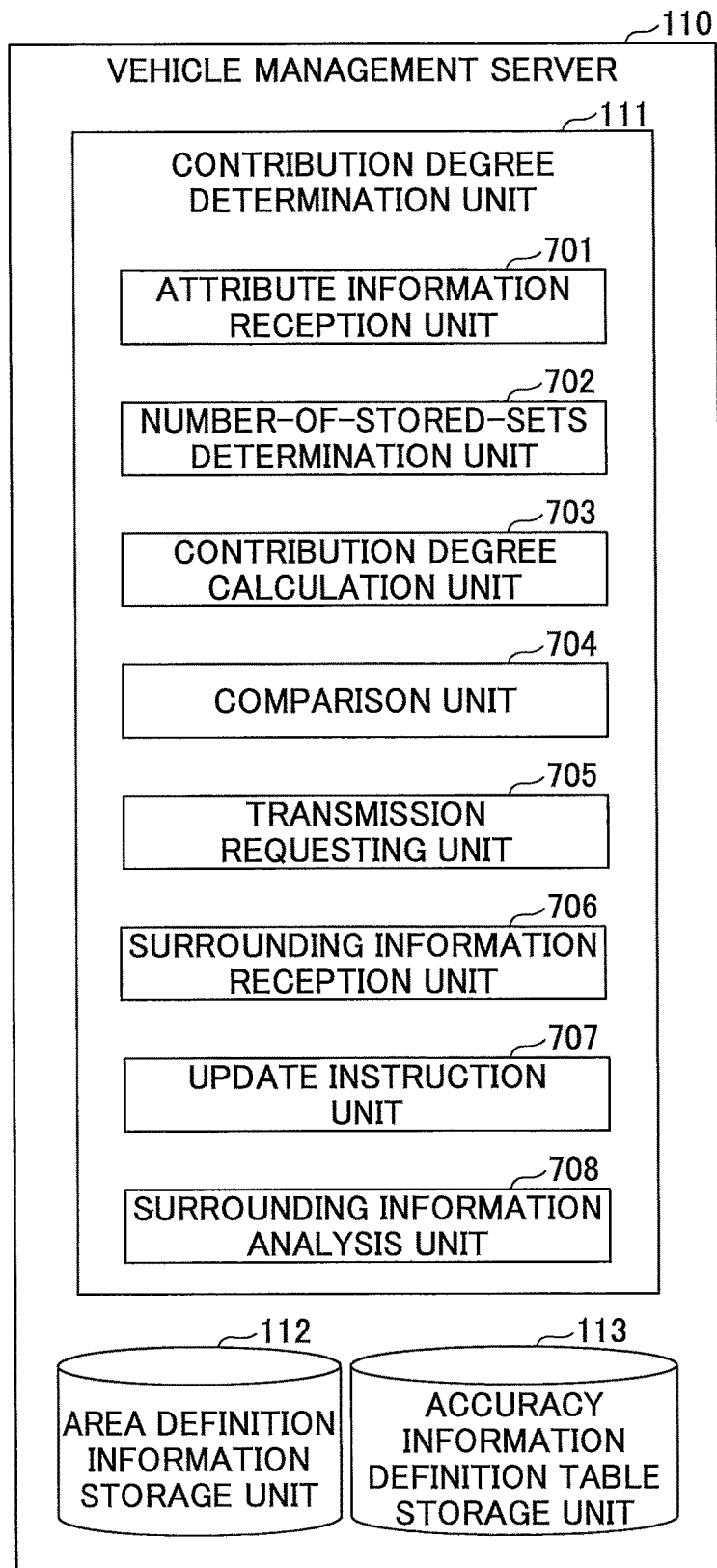
FIG. 7 illustrates one example of a functional configuration of a vehicle management server.

Next, a functional configuration of the vehicle management server 110 will be described in detail. FIG. 7 illustrates one example of a functional configuration of the vehicle management server. As illustrated in FIG. 7, the vehicle management server 110 that functions as the contribution determination unit 111 includes an attribute information reception unit 701, a number-of-stored-sets determination unit 702, a contribution calculation unit 703, a comparison unit 704, a transmission requesting unit 705, and a surrounding information reception unit 706. The vehicle management server 110 that functions as the contribution determination unit 111 further includes an update instruction unit 707 and a surrounding information analysis unit 708.

The attribute information reception unit 701 is one example of a reception unit, and receives the attribution information transmitted from the surrounding information acquisition apparatus 142 of the vehicle 130, via the network 150. Also, the attribute information reception unit 701 extracts the time information, the position information, the type information, and the accuracy information from the received attribution information. Also, the attribute information reception unit 701 reads the area definition information 400 from the area definition information storage unit 112, and determines the area corresponding to the extracted position information. Also, the attribute information reception unit 701 sends the area information that indicates the determined area, and the extracted type information to the number-of-stored-sets determination unit 702. Also, the attribute information reception unit 701 sends the area information that indicates the determined area and the extracted type information and accuracy information to the contribution calculation unit 703.

The number-of-stored-sets determination unit 702 requests the information management server 120 to calculate the number of stored sets of surrounding information. Actually, the number-of-stored-sets determination unit 702 requests the information management server 120 to calculate the number of stored sets of surrounding information associated with the area information and type information that have been sent from the attribute information reception unit 701.

When the information management server 120 has transmitted information that indicates the number of stored sets in response to the request of the number-of-stored-sets determination unit 702 to calculate the number of stored sets, the number-of-stored-sets determination unit 702 determines whether the number of stored sets indicated by the transmitted information is greater than or equal to a predetermined number.

If the number-of-stored-sets determination unit 702 has determined that the number of stored sets indicated by the transmitted information is less than the predetermined number, the number-of-stored-sets determination unit 702 sends the determination result to the transmission requesting unit 705. If the number-of-stored-sets determination unit 702 has determined that the number of stored sets indicated by the transmitted information is greater than or equal to the predetermined number, the number-of-stored-sets determination unit 702 sends the determination result to the contribution calculation unit 703.

When the contribution calculation unit 703 has received the determination result that the number of stored sets is greater than or equal to the predetermined number from the number-of-stored-sets determination unit 702, the contribution calculation unit 703 requests the information management server 120 to calculate the contribution degree lowest value, using the area information and type information that have been sent from the attribute information reception unit 701.

In response to the request to calculate the contribution degree lowest value, the information management server 120 transmits information that indicates the contribution degree lowest value that is the lowest contribution degree from among the contribution degrees calculated for the respective sets of surrounding information associated with the area information and the type information included in the request made by the contribution calculation unit 703. The contribution calculation unit 703 acquires the transmitted information.

Also, the contribution calculation unit 703 calculates the contribution degree for the accuracy information that has been sent from the attribute information reception unit 701, and sends the calculated contribution degree to the comparison unit 704 together with the contribution degree lowest value that has been transmitted from the information management server 120.

Note that, in the present embodiment, the contribution degree is calculated by the following formula.

contribution degree=accuracy information×Exp(x)

where x=−(elapsed time from when surrounding information was acquired)/Tc where Tc denotes a time constant Actually, when the contribution calculation unit 703 calculates the contribution degree, the contribution calculation unit 703 substitutes "0" for the "elapsed time from when surrounding information was acquired" (as a result, the contribution calculation unit 703 calculates the contribution degree to be the accuracy information itself).

When the information management server 120 calculates the contribution degree of each set of surrounding information in response to a request to calculate the contribution degree lowest value, the information management server 120 calculates the "elapsed time from when surrounding information was acquired" based on the present time and the time information associated with the set of surrounding information. Note that the "present time" means, for example, the time when the attribute information reception unit 701 has received the attribution information. Then, the information management server 120 calculates the contribution degree by substituting the "accuracy information" associated with the set of surrounding information, and the calculated "elapsed time from when surrounding information was acquired" in the above formula. Thus, the information management server 120 calculates the changed contribution degree acquired from reducing the accuracy information of the set of surrounding information according to the "elapsed time from when surrounding information was acquired".

Figure 8:
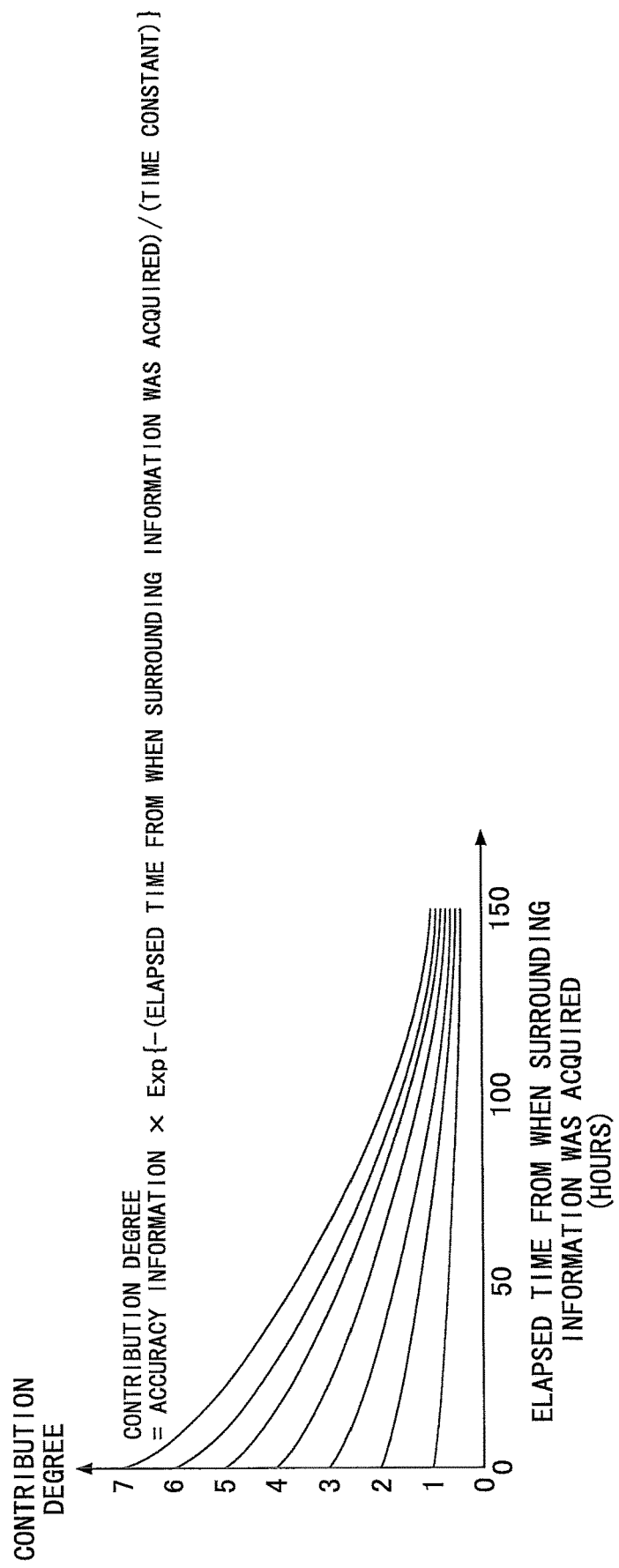
FIG. 8 illustrates relations between an "elapsed time from when surrounding information was acquired" and a contribution degree.

FIG. 8 illustrates relations between the "elapsed time from when surrounding information was acquired" and the corresponding contribution degree. As illustrated in FIG. 8, when the elapsed time is "0", the contribution degree is equal to the accuracy information, and the contribution degree gradually reduces with time.

Returning to the description of FIG. 7, the comparison unit 704 is one example of a determination unit, and determines whether the contribution degree sent from the contribution calculation unit 703 is greater than the contribution degree lowest value. If the comparison unit 704 has determined that the contribution degree sent from the contribution calculation unit 703 is greater than the contribution degree lowest value, the comparison unit 704 sends the determination result to the transmission requesting unit 705. Thus, the comparison unit 704 uses the contribution degree lowest value as a threshold for determining whether to send the determination result to the transmission requesting unit 705.

When the transmission requesting unit 705 has received the determination result from the number-of-stored-sets determination unit 702, the transmission requesting unit 705 functions as a second transmission requesting unit that requests the surrounding information acquisition system 140 of the vehicle 130 to transmit the surrounding information. Also, when the transmission requesting unit 705 has received the determination result from the comparison unit 704, the transmission requesting unit 705 functions as a first transmission requesting unit that requests the surrounding information acquisition system 140 of the vehicle 130 to transmit the surrounding information. Note that, if the transmission requesting unit 705 has not received the determination result from either of the number-of-stored-sets determination unit 702 and the comparison unit 704, the transmission requesting unit 705 does not request the surrounding information acquisition system 140 of the vehicle 130 to request to transmit the surrounding information.

If the surrounding information acquisition system 140 of the vehicle 130 has transmitted the surrounding information and the vehicle ID in response to a request of the transmission requesting unit 705 to transmit surrounding information, the surrounding information reception unit 706 receives the surrounding information and the vehicle ID. Also, the surrounding information reception unit 706 associates the received surrounding information and vehicle ID with the attribution information received by the attribute information reception unit 701 and the area information that indicates the area determined by the attribute information reception unit 701, and sends the surrounding information, the vehicle ID, the attribution information, and the area information to the update instruction unit 707.

The update instruction unit 707 transmits the received surrounding information, vehicle ID, attribution information, and area information as the update information together with an update instruction to the information management server 120.

The surrounding information analysis unit 708 monitors the transmission requesting unit 705 and the update instruction unit 707. Then, if the dynamic map information storage unit 122 of the information management server 120 has been updated, the surrounding information analysis unit 708 increases the score of the user of the vehicle which has contributed to the update. Actually, if the transmission requesting unit 705 has requested to transmit the surrounding information, the surrounding information analysis unit 708 determines whether the request has been made in response to the information that is sent from the number-of-stored-sets determination unit 702 or the information that is sent from the comparison unit 704. If the surrounding information analysis unit 708 has determined that the request has been made in response to the information from the comparison unit 704, the surrounding information analysis unit 708 increases the score of the user of the vehicle that has transmitted the surrounding information in response to the request to transmit the surrounding information.

<8. Functional Configuration of Information Management Server>

Figure 9:
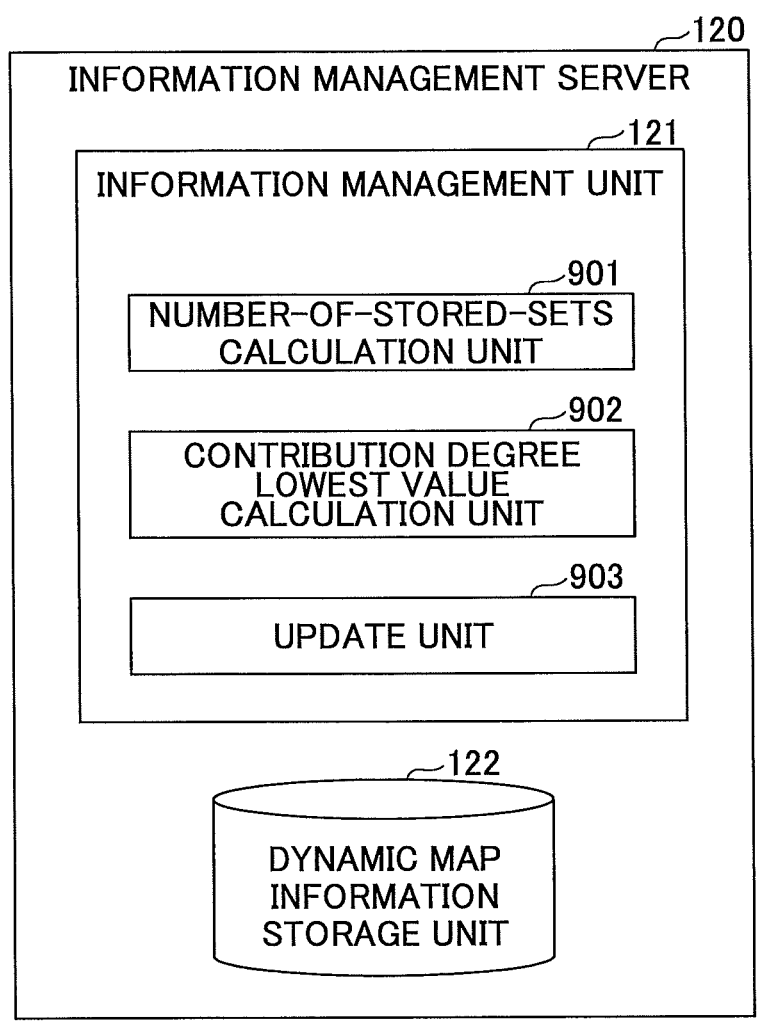
FIG. 9 illustrates one example of a functional configuration of an information management server.

Next, a functional configuration of the information management server 120 will be described. FIG. 9 illustrates one example of a functional configuration of the information management server 120. As illustrated in FIG. 9, the information management server 120 that functions as the number-of-stored-sets calculation unit 901 includes a number-of-stored-sets calculation unit 901, a contribution degree lowest value calculation unit 902 and an update unit 903.

When the number-of-stored-sets calculation unit 901 has received the request to calculate the number of stored sets from the vehicle management server 110, the number-of-stored-sets calculation unit 901 extracts the area information and the type information from the request to calculate the number of stored sets. Also, the number-of-stored-sets calculation unit 901 reads the dynamic map information storage unit 122 based on the extracted area information and type information. Then, the number-of-stored-sets calculation unit 901 calculates the number of stored sets of surrounding information (the number of stored sets) concerning the dynamic map information (for example, the dynamic map information 601) associated with the extracted area information and type information. The number-of-stored-sets calculation unit 901 transmits information that indicates the calculated number of stored sets to the vehicle management server 110.

When the contribution degree lowest value calculation unit 902 has received the request to calculate the contribution degree lowest value from the vehicle management server 110, the contribution degree lowest value calculation unit 902 extracts the area information and the type information from the request to calculate the contribution degree lowest value. Also, the contribution degree lowest value calculation unit 902 reads the dynamic map information storage unit 122 based on the extracted area information and type information. Then, the contribution degree lowest value calculation unit 902 acquires the time information and the accuracy information of each of the stored sets of surrounding information concerning the dynamic map information (for example, the dynamic map information 601) associated with the extracted area information and type information.

Also, the contribution degree lowest value calculation unit 902 calculates the contribution degree of each set of surrounding information based on the acquired time information and the accuracy information. Actually, the contribution degree lowest value calculation unit 902 uses the above formula to correct the acquired accuracy information based on the acquired time information to calculate the contribution degree that is the corrected accuracy information.

For example, the contribution degree lowest value calculation unit 902 calculates the "elapsed time from when surrounding information was acquired" using the difference between the time stored in the item "time information" of the dynamic map information 601 and the present time. Then, the contribution degree lowest value calculation unit 902 calculates the contribution degree of each set of surrounding information using the above formula based on the accuracy information stored in the item "accuracy information" of the dynamic map information 601 and the calculated elapsed time.

Also, the contribution degree lowest value calculation unit 902 functions as a calculation unit that calculates the lowest contribution degree (the contribution degree lowest value) from among the calculated contribution degrees of the respective sets of surrounding information. Also, the contribution degree lowest value calculation unit 902 transmits the calculated contribution degree lowest value to the vehicle management server 110.

The update unit 903 receives the update instruction transmitted from the vehicle management server 110 together with the update information. Also, the update unit 903 updates the dynamic map information storage unit 122 based on the received update information. For updating the dynamic map information storage unit 122 based on the received update information, the update unit 903 uses the number of stored sets calculated by the number-of-stored-sets calculation unit 901. If the update unit 903 has determined that the number of stored sets is less than the predetermined number, the update unit 903 stores the received update information in the dynamic map information storage unit 122. If the update unit 903 has determined that the number of stored sets is greater than or equal to the predetermined number, the update unit 903 removes the set of surrounding information for which the contribution degree lowest value calculation unit 902 has calculated the contribution degree lowest value from the dynamic map information storage unit 122, and stores the received update information. Thus, the update unit 903 stores the received update information in a manner of replacing the set of surrounding information for which the contribution degree lowest value has been calculated with the received update information.

<9. Flow of Surrounding Information Collection Process in Surrounding Information Collection System>

Figure 10:
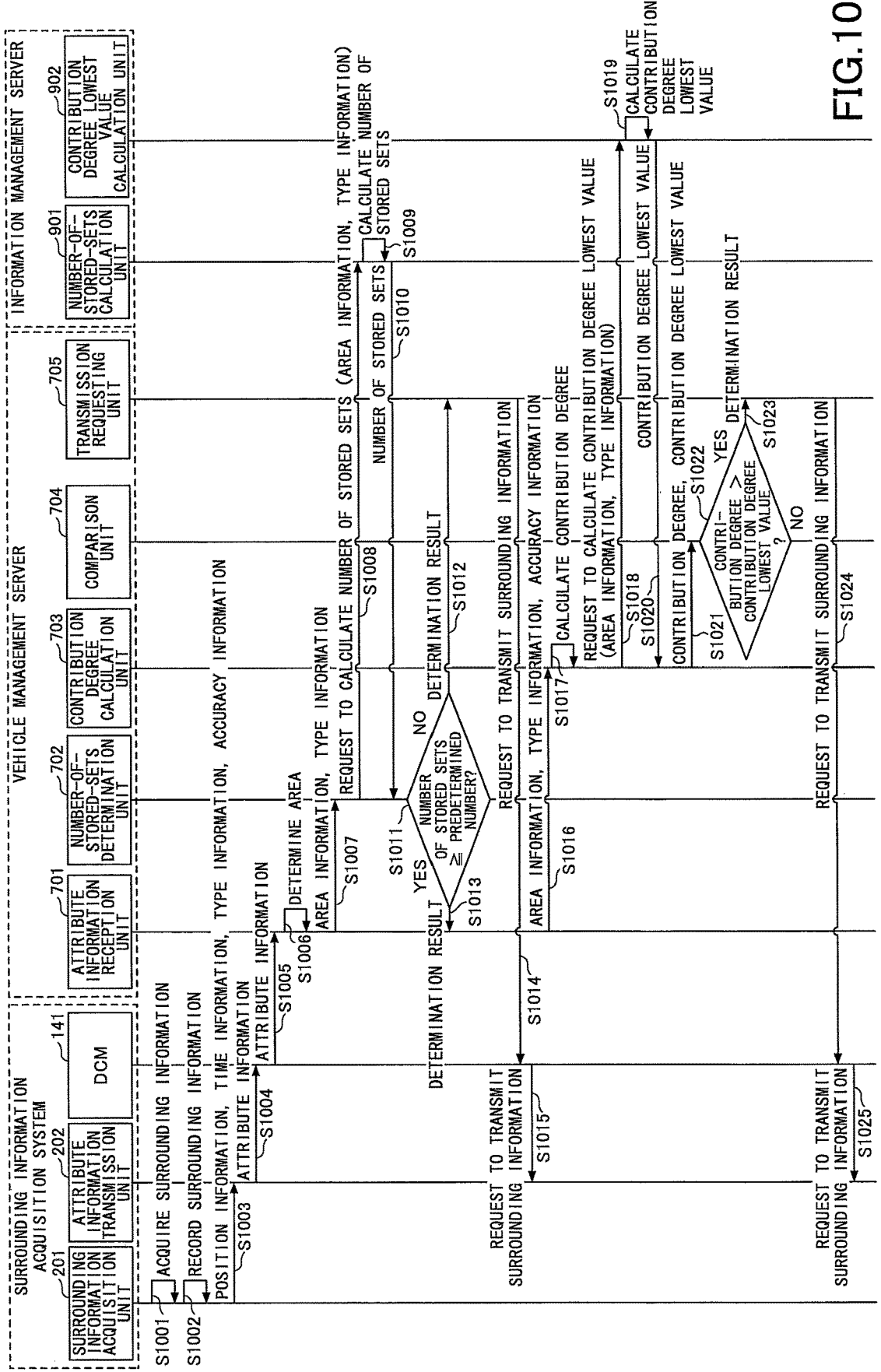
FIGS. 10 and 11 are sequence diagrams illustrating a surrounding information collection process in a surrounding information collection system.
Figure 11:
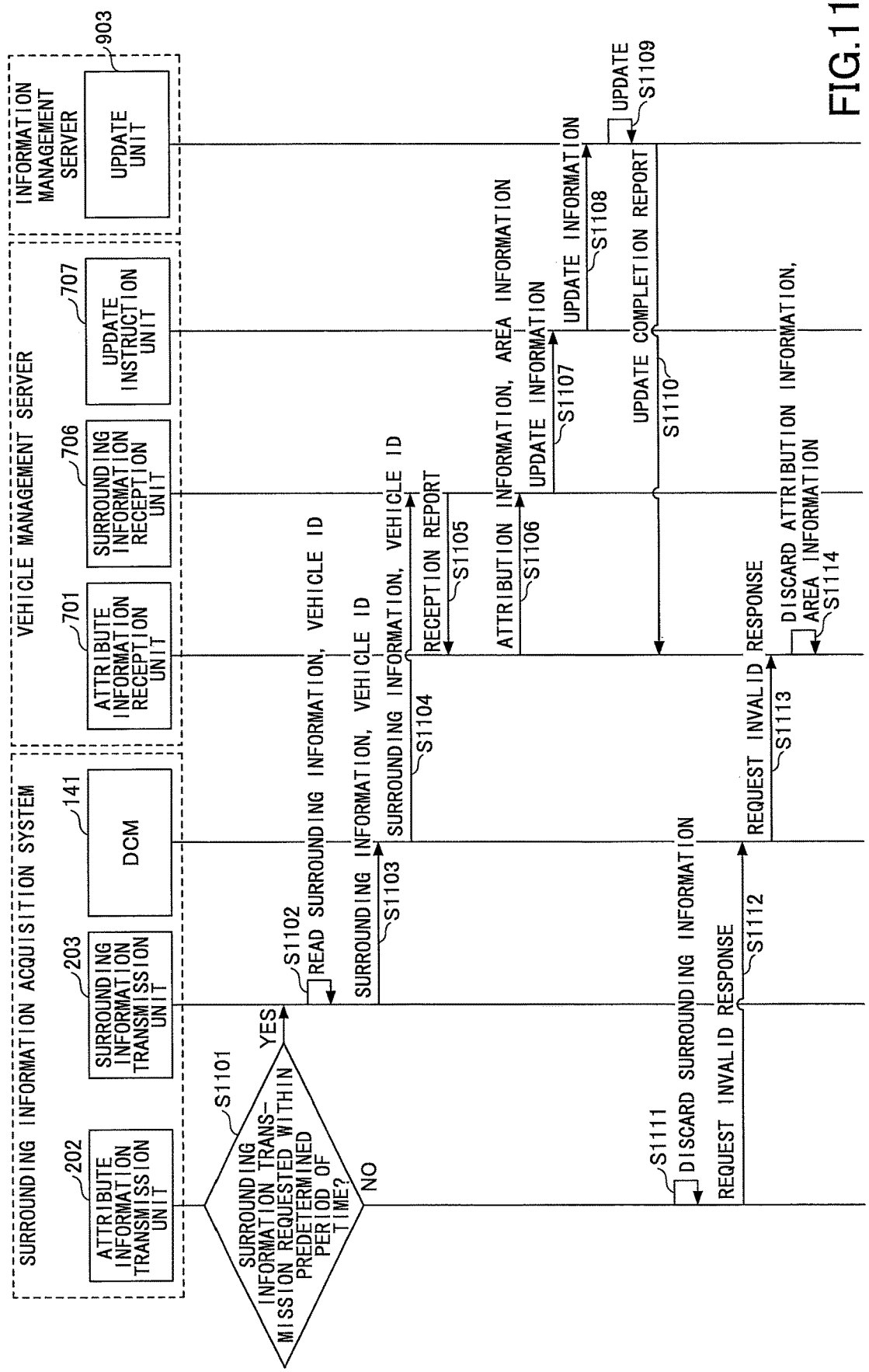

Next, a flow of a surrounding information collection process in the surrounding information collection system 100 will be described. FIGS. 10 and 11 are sequence diagrams illustrating a surrounding information collection process in the surrounding information collection system.

When the vehicle 130 has entered a state where the ignition key has been turned on in step S1001, the surrounding information acquisition unit 201 acquires the surrounding information detected by the surrounding information acquisition sensor (for example, the first surrounding information acquisition sensor 221). In step S1002, the surrounding information acquisition unit 201 associates the acquired surrounding information with the position information, the time information, the type information, and the accuracy information, and records the surrounding information in the surrounding information recording unit 205.

In step S1003, the surrounding information acquisition unit 201 sends the position information, the time information, the type information, and the accuracy information recorded and associated with the surrounding information to the attribution information transmission unit 202.

In step S1004, the attribution information transmission unit 202 generates the attribution information that includes the position information, the time information, the type information, and the accuracy information that have been sent from the surrounding information acquisition unit 201, and sends the generated attribution information to the DCM 141.

In step S1005, the DCM 141 transmits the attribution information that has been sent from the attribution information transmission unit 202 to the vehicle management server 110 via the network 150.

In step S1006, the attribute information reception unit 701 receives the attribution information transmitted from the vehicle 130, and extracts the position information, the time information, the type information, and the accuracy information from the attribution information. Also, the attribute information reception unit 701 reads the area definition information 400 based on the extracted position information, and determines the area corresponding to the position information.

In step S1007, the attribute information reception unit 701 sends the area information that indicates the area determined in step S1006, and the type information extracted in step S1006, to the number-of-stored-sets determination unit 702.

In step S1008, the number-of-stored-sets determination unit 702 generates a request that includes the area information and the type information that have been sent from the attribute information reception unit 701 to calculate the number of stored sets, and transmits the request to the information management server 120.

In step S1009, the number-of-stored-sets calculation unit 901 of the information management server 120 receives the request to calculate the number of stored sets from the vehicle management server 110, and extracts the area information and the type information from the request. The number-of-stored-sets calculation unit 901 then reads the dynamic map information (for example, the dynamic map information 601) corresponding to the extracted area information and type information from the dynamic map information storage unit 122. The number-of-stored-sets calculation unit 901 then calculates the number of sets of surrounding information (the number of stored sets) included in the stored dynamic map information that has been read.

In step S1010, the number-of-stored-sets calculation unit 901 transmits the calculated number of stored sets to the vehicle management server 110.

In step S1011, the number-of-stored-sets determination unit 702 receives the number of stored sets transmitted from the information management server 120, and determines whether the received number of stored sets is greater than or equal to the predetermined number. If the number-of-stored-sets determination unit 702 determines that the received number of stored sets is less than the predetermined number in step S1011 (NO in step S1011), the number-of-stored-sets determination unit 702 proceeds to step S1012, and sends the determination result to the transmission requesting unit 705.

On the other hand, if the number-of-stored-sets determination unit 702 determines that the received number of stored sets is greater than or equal to the predetermined number in step S1011 (YES in step S1011), the number-of-stored-sets determination unit 702 proceeds to step S1013, and sends the determination result to the attribute information reception unit 701.

The transmission requesting unit 705 that has received the determination result from the number-of-stored-sets determination unit 702 transmits a request to transmit the surrounding information to the vehicle 130 in step S1014.

The DCM 141 that has received the request to transmit the surrounding information from the transmission requesting unit 705 sends a request to transmit the surrounding information to the attribution information transmission unit 202, in step S1015.

On the other hand, the attribute information reception unit 701 that has received the determination result from the number-of-stored-sets determination unit 702 sends the area information, the type information, and the accuracy information to the contribution calculation unit 703 in step S1016.

In step S1017, the contribution calculation unit 703 calculates the contribution degree using the accuracy information received from the attribute information reception unit 701. In step S1018, the contribution calculation unit 703 generates a request that includes the area information and the type information received from the attribute information reception unit 701 to calculate the contribution degree lowest value, and transmits the request to the information management server 120.

In step S1019, the contribution degree lowest value calculation unit 902 receives the request to calculate the contribution degree lowest value from the contribution calculation unit 703, and extracts the area information and the type information included in the request. The contribution degree lowest value calculation unit 902 then reads the sets of dynamic map information corresponding to the extracted area information and type information from the dynamic map information storage unit 122. The contribution degree lowest value calculation unit 902 then calculates the respective contribution degrees of the sets of surrounding information included in the sets of dynamic map information that have been read. The contribution degree lowest value calculation unit 902 then calculates the lowest contribution degree (the contribution degree lowest value) based on the calculated contribution degrees of the respective sets of surrounding information.

In step S1020, the contribution degree lowest value calculation unit 902 transmits the contribution degree lowest value calculated in step S1019 to the vehicle management server 110.

In step S1021, the contribution calculation unit 703 receives the contribution degree lowest value transmitted from the contribution degree lowest value calculation unit 902, and sends the received contribution degree lowest value, and the contribution degree calculated in step S1017, to the comparison unit 704.

In step S1022, the comparison unit 704 compares the contribution degree with the contribution degree lowest value both sent from the contribution calculation unit 703.

If the comparison unit 704 has determined that the contribution degree is greater than the contribution degree lowest value, the comparison unit 704 proceeds to step S1023, and sends the determination result to the transmission requesting unit 705. If the comparison unit 704 has determined that the contribution degree is less than or equal to the contribution degree lowest value, the comparison unit 704 does not send the determination result to the transmission requesting unit 705.

In step S1024, the transmission requesting unit 705 transmits a request to transmit the surrounding information to the vehicle 130.

The DCM 141 that has received the request to transmit the surrounding information from the transmission requesting unit 705 sends a request to transmit the surrounding information to the attribution information transmission unit 202 in step S1025.

Then, in step S1101 of FIG. 11, the attribution information transmission unit 202 determines whether the attribution information transmission unit 202 has received a request to transmit the surrounding information from the vehicle management server 110 within a predetermined period of time from when the attribution information transmission unit 202 transmitted the attribution information.

In step S1101, if the attribution information transmission unit 202 determines that the attribution information transmission unit 202 has received a request to transmit the surrounding information within the predetermined period of time, the process proceeds to step S1102. In step S1102, the surrounding information transmission unit 203 reads the surrounding information recorded in the surrounding information recording unit 205 in step S1002 (FIG. 10) together with the vehicle ID.

In step S1103, the surrounding information transmission unit 203 sends the read surrounding information and vehicle ID to the DCM 141. In step S1104, the DCM 141 transmits the surrounding information and the vehicle ID to the vehicle management server 110.

In step S1105, when the surrounding information reception unit 706 has received the surrounding information and the vehicle ID from the vehicle 130, the surrounding information reception unit 706 sends a reception notification to the attribute information reception unit 701.

In step S1106, in response to the reception notification, the attribute information reception unit 701 sends the attribution information (the time information, the position information, the type information, and the accuracy information), and the area information to the surrounding information reception unit 706. In step S1107, the surrounding information reception unit 706 creates update information that includes the time information, the area information, the position information, the type information, the accuracy information, the surrounding information, and the vehicle ID, and sends the update information to the update instruction unit 707.

In step S1108, the update instruction unit 707 transmits the update information and an update instruction to the information management server 120.

In step S1109, the update unit 903 of the information management server 120 stores the update information in the dynamic map information storage unit 122. At this time, the update unit 903 determines whether the number of stored sets of surrounding information stored in the dynamic map information is greater than or equal to the predetermined number. If the update unit 903 determines that the number of stored sets of surrounding information is greater than or equal to the predetermined number, the update unit 903 deletes the surrounding information that has the contribution degree lowest value. In step S1110, the update unit 903 transmits an update completion report to the vehicle management server 110.

In step S1114, if the attribute information reception unit 701 has received the update completion report from the information management server 120, the attribute information reception unit 701 discards the attribution information and the area information.

On the other hand, if the attribution information transmission unit 202 determines that the attribution information transmission unit 202 has not received a request to transmit the surrounding information within the predetermined period of time in step S1101, the attribution information transmission unit 202 discards the surrounding information that has been recorded in step S1001 in the surrounding information recording unit 205, in step S1111.

In step S1112, the attribution information transmission unit 202 sends a request invalid response to the DCM 141. In step S1113, the DCM 141 transmits the request invalid response to the vehicle management server 110.

In step S1114, if the attribute information reception unit 701 has received the request invalid response from the vehicle 130, the attribute information reception unit 701 discards the attribution information and the area information.

<10. Actual Example of Surrounding Information Collection Process in Surrounding Information Collection System>

Next, an actual example of the surrounding information collection process in the surrounding information collection system 100 will be described with reference to FIGS. 12-14.

Figure 12:
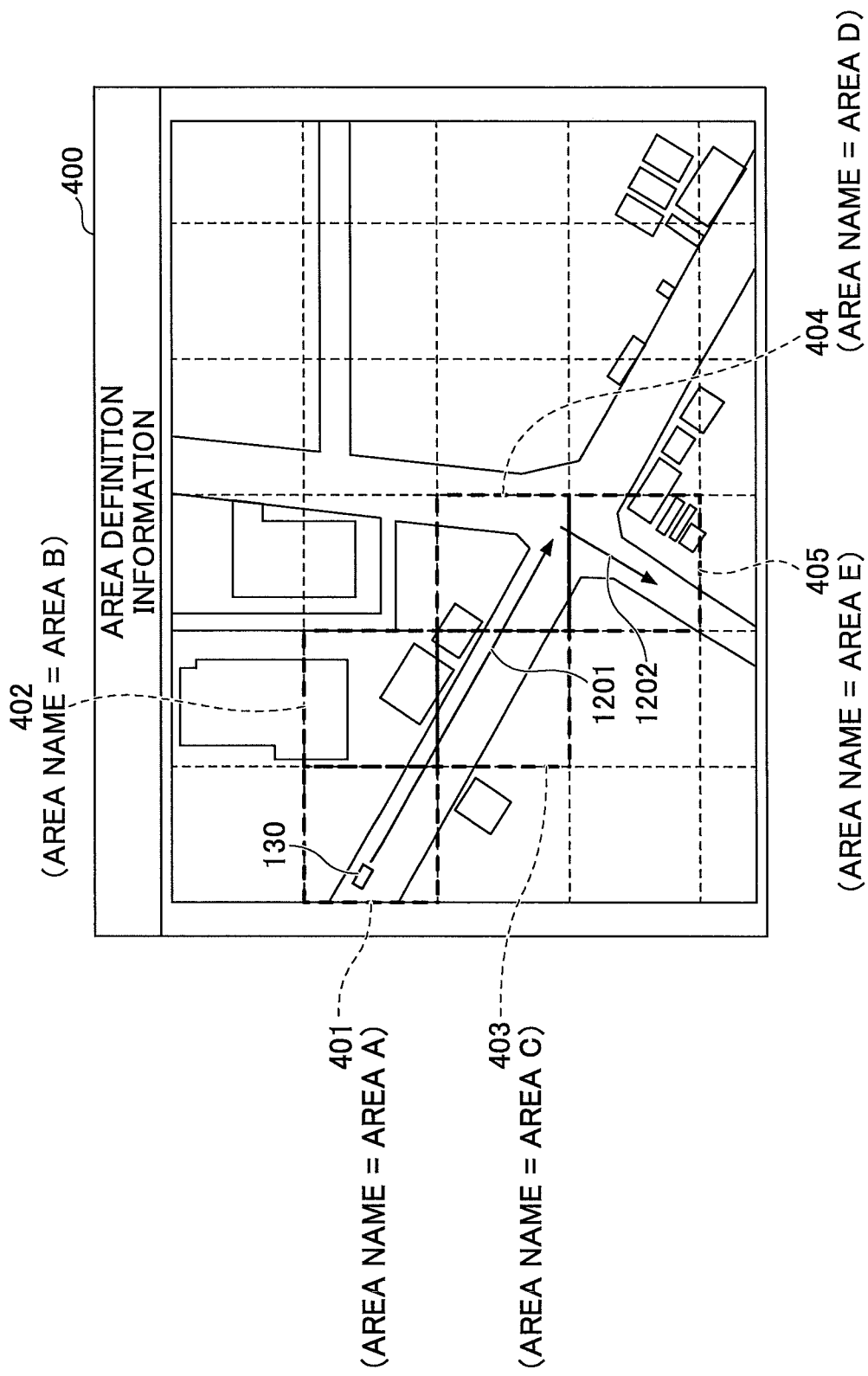

FIG. 12 illustrates a state where a vehicle travels through respective places where the area definition information has prescribed the corresponding areas. As illustrated in FIG. 12, it is assumed that a vehicle 130 travels on a road indicated by the area definition information 400 along arrows 1201 and 1202.

At this time, the vehicle 130 records the surrounding information in the surrounding information recording unit 205, and transmits the attribution information to the vehicle management server 110.

The vehicle management server 110 determines that the vehicle 130 has passed through an area A, an area B, an area C, an area D, and an area E based on position information included in the attribution information transmitted from the vehicle 130.

FIG. 13 illustrates the surrounding information recording result 510 that is recorded in the surrounding information recording unit 205 while the vehicle 130 passes through the area A, the area B, the area C, the area D, and the area E. The zones in FIG. 13 where hatching is provided indicate that a request to transmit the surrounding information has not been received from the vehicle management server 110 within the predetermined period of time from when the attribution information was transmitted.

On the other hand, white zones in FIG. 13 indicate that a request to transmit the surrounding information has been received from the vehicle management server 110 within the predetermined period of time from when the attribution information was transmitted, and that the surrounding information has been transmitted to the vehicle management server 110.

Thus, the vehicle 130 transmits only the sets of surrounding information (the white zones) which the vehicle management server 110 has requested the vehicle 130 to transmit, from among the sets of surrounding information (the hatched zones and the white zones) acquired during the travel, to the vehicle management server 110. Therefore, in comparison to a case of transmitting all the sets of surrounding information (the hatched zones and the white zones) acquired during the travel, it is possible to reduce the number of sets of surrounding information to transmit to the vehicle management server 110. Here, the communications traffic required to transmit the surrounding information is much greater than the communications traffic required to transmit the attribution information. Therefore, by reducing the number of sets of surrounding information to transmit to the vehicle management server 110, it is possible to reduce the communications traffic between the vehicle 130 and the vehicle management server 110.

Note that, sets of surrounding information that have not been transmitted to the vehicle management server 110 are sets of surrounding information determined as having low contribution degrees in comparison to the sets of surrounding information already stored in the dynamic map information storage unit 122 of the information management server 120. Therefore, it can be said that even through sets of surrounding information have not been transmitted, likelihood that creation and update of the dynamic map is affected is low.

FIG. 14 illustrates a state where each set of dynamic map information in the dynamic map information storage unit 122 is updated with time. Description will now be made in comparison to FIG. 6. Each set of dynamic map information illustrated in FIG. 14 is dynamic map information changed from the corresponding one illustrated in FIG. 6 due to an elapse of a certain period of time. Thus, each set of dynamic map information illustrated in FIG. 14 is partially changed from the corresponding one illustrated in FIG. 6.

For example, in the example of FIG. 6, the dynamic map information 601 has a set of surrounding information (data name "3D target information 4-011") acquired by the vehicle of "vehicle ID=C4" and having "accuracy information=2".

On the other hand, in the example of FIG. 14, the set of surrounding information (data name "3D target information 4-011") is replaced with a set of surrounding information (data name "3D target information 16-002") having "accuracy information=7".

Note that, also in FIG. 14, the data name (for example, "3D target information 1-001") of each set of surrounding information is mentioned in the item "surrounding information" for the sake of simplifying the explanation. Actually, in the item "surrounding information", the corresponding set of surrounding information itself is stored.

Thus, according to the surrounding information collection system 100, a set of surrounding information stored in the dynamic map information storage unit 122 is replaced with a set of surrounding information having a higher contribution degree with time.

<11. Flow of Surrounding Information Analysis Process in Surrounding Information Collection System>

Figure 15:
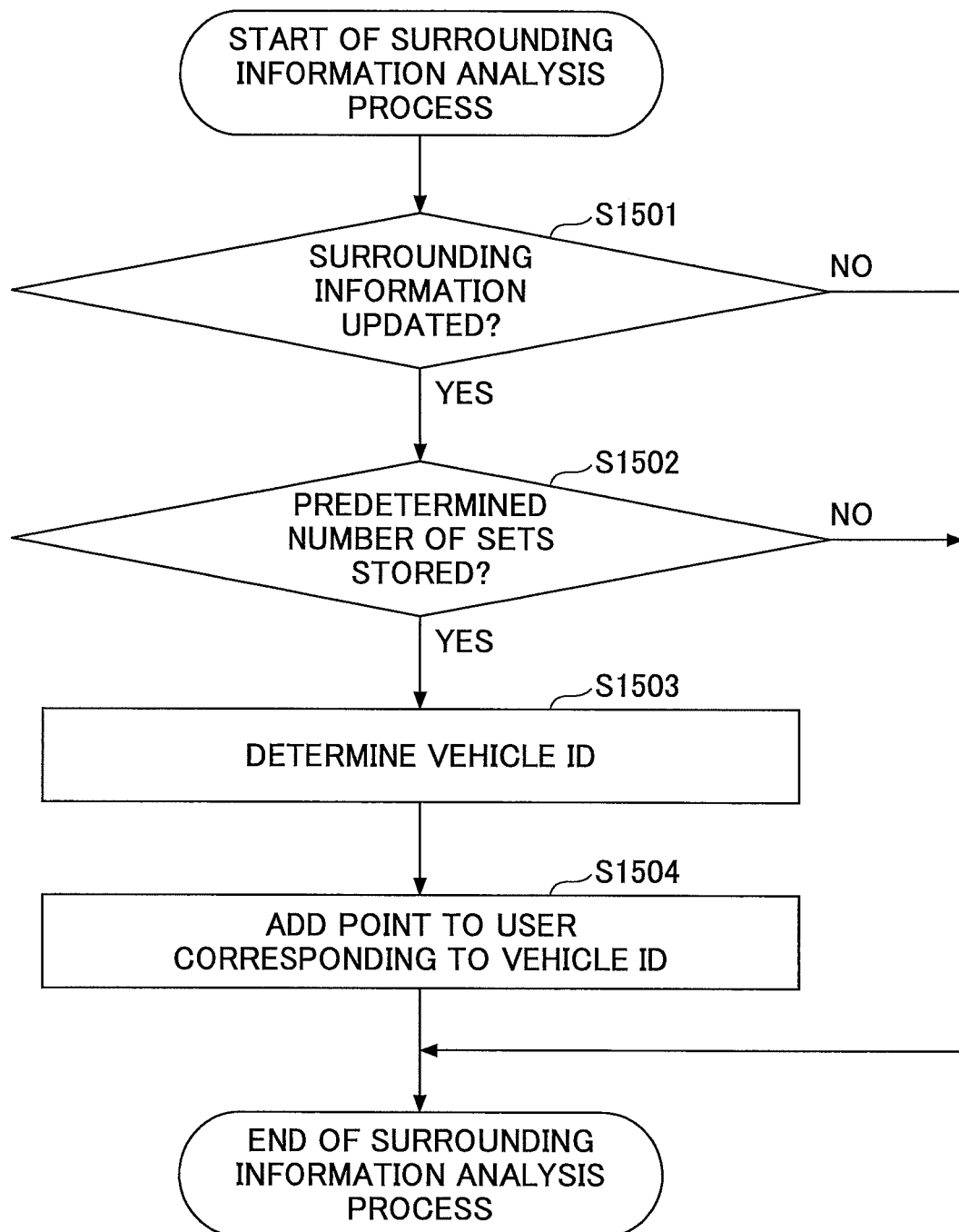
FIG. 15 is a flowchart illustrating a flow of a surrounding information analysis process in the surrounding information collection system.

Next, a flow of a surrounding information analysis process in the surrounding information collection system 100 will be described. FIG. 15 is a flowchart illustrating a flow of a surrounding information analysis process in the surrounding information collection system. In step S1501, the surrounding information analysis unit 708 monitors the update instruction unit 707 to determine whether the dynamic map information storage unit 122 has been updated.

In step S1501, if the surrounding information analysis unit 708 has determined that the dynamic map information storage unit 122 has not been updated, the surrounding information analysis unit 708 ends the surrounding information analysis process. On the other hand, if the surrounding information analysis unit 708 has determined that the dynamic map information storage unit 122 has been updated, the surrounding information analysis unit 708 proceeds to step S1502.

In step S1502, the surrounding information analysis unit 708 determines whether the fact that the update instruction unit 707 has transmitted the update information is caused by a request to send the surrounding information based on a notification from the number-of-stored-sets determination unit 702 or a notification from the comparison unit 704.

If the surrounding information analysis unit 708 has determined that the fact that the update instruction unit 707 has transmitted the update information is caused by a request to send the surrounding information based on a notification from the number-of-stored-sets determination unit 702, the surrounding information analysis unit 708 determines that the number of stored sets is less than the predetermined number (NO in step S1502), and ends the surrounding information analysis process.

On the other hand, if the surrounding information analysis unit 708 has determined that the fact that the update instruction unit 707 has transmitted the update information is caused by a request to send the surrounding information based on a notification from the comparison unit 704, the surrounding information analysis unit 708 determines that the number of stored sets is greater than or equal to the predetermined number (YES in step S1502), and the surrounding information analysis unit 708 proceeds to step S1503.

In step S1503, the surrounding information analysis unit 708 determines the vehicle ID included in the update information transmitted from the update instruction unit 707. In step S1504, the surrounding information analysis unit 708 determines the user corresponding to the determined vehicle ID, and increases the score of the determined user.

Thus, according to the surrounding information collection system 100, a user who transmits surrounding information that has a higher contribution degree can acquire a higher score. That is, the user who has, for example, a classy car that has surrounding information acquisition sensors capable of detecting surrounding information of high accuracy can acquire a higher score. As a result, according to the surrounding information collection system 100, it is possible to give an incentive to a user who maintains a classy car, for example.

Note that there can be various uses of the score that a user acquires. For example, it is possible to reflect the score in an insurance setting for the user.

<12. Summary of Embodiment>

As can be seen from the above description, the surrounding information collection system 100 of the present embodiment has the following features:

An information management server corrects accuracy information associated with stored surrounding information, according to freshness of the information (i.e., the elapsed time from when the surrounding information was acquired), to calculate a contribution degree. Also, the information management server calculates the lowest contribution degree (the contribution degree lowest value) from the calculated contribution degrees.

If a vehicle has acquired surrounding information, the vehicle management server receives the accuracy information concerning the surrounding information from the vehicle. Also, at a timing when the management server has received the accuracy information, the vehicle management server acquires the contribution degree lowest value from the information management server.

Such a control is made that, if the contribution degree calculated based on the accuracy information received by the vehicle management server from the vehicle is greater than the acquired contribution degree lowest value, the information management server requests the vehicle to transmit the surrounding information, whereas if the contribution degree calculated based on the accuracy information is less than or equal to the acquired contribution degree lowest value, the information management server does not request the vehicle to transmit the surrounding information.

Thus, according to the surrounding information collection system 100 of the present embodiment, targets to be collected as surrounding information are limited, and therefore, it is possible to reduce communications traffic required for collecting the surrounding information.

Thus, according to one aspect of the present disclosure, a surrounding information collection system requests a vehicle to transmit surrounding information, and stores the surrounding information transmitted from the vehicle in response to the requesting. Therefore, it is possible to collect surrounding information that is transmitted according to a request.

Also, according to the aspect, the surrounding information collection system requests a vehicle to transmit surrounding information, the vehicle acquiring the surrounding information greater than a threshold calculated based on accuracy of the stored surrounding information. Therefore, it is possible to limit vehicles requested to transmit surrounding information to vehicles that acquire surrounding information having accuracy greater than the threshold calculated based on the accuracy of the stored surrounding information. It is also possible to limit surrounding information to be requested from vehicles into surrounding information having accuracy greater than the threshold. As a result, when surrounding information acquired by vehicles is collected via a communications network, collection targets are limited. Therefore, it is possible to reduce the communications traffic required to collect the surrounding information.

Thus, according to the aspect, when surrounding information acquired by vehicles is collected via a communications network, collection targets are limited based on accuracy of the surrounding information. Therefore, it is possible to reduce the communications traffic required to collect the surrounding information.

The surrounding information collection systems and the surrounding information acquisition apparatuses have been described in the embodiments. However, the present invention is not limited to these embodiments. Various modifications and improvements can be made within the scope of the present invention such as those shown below, for example.

[Variant No. 1]

In the above-mentioned embodiment, the attribution information transmission unit 202 transmits the attribution information that includes the position information, the time information, the type information, and the accuracy information to the vehicle management server 110, if the surrounding information acquisition unit 201 has acquired surrounding information. However, the attribution information transmission unit 202 may transmit the attribution information without regard to whether the surrounding information acquisition unit 201 has acquired the surrounding information.

Also, in the above-mentioned embodiment, the attribution information transmission unit 202 transmits the position information, the time information, the type information, and the accuracy information as the attribution information. However, if the vehicle management server 110 associates the type information and the accuracy information with the vehicle ID when the vehicle management server 110 stores the type information and the accuracy information, the attribution information transmission unit 202 may transmit the attribution information that includes the vehicle ID instead of the type information and the accuracy information.

In this case, the vehicle management server 110 does not request the vehicle which has transmitted the accuracy information greater than the contribution degree lowest value but requests the vehicle (that the vehicle management server 110 previously knows) which can acquire the accuracy information greater than the contribution degree lowest value to transmit surrounding information.

That is, in the vehicle management server 110, the comparison unit 704 need not carry out the determination.

[Variant No. 2]

In the above-mentioned embodiment, targets from which surrounding information are requested and targets to be requested are limited to reduce the communications traffic required to collect surrounding information. However, the surrounding information acquisition apparatus 142 (that is, the vehicle 130) itself may determine whether to transmit surrounding information.

In the accuracy information setting table 500, the sensor types, the accuracy information, and the type information are prescribed concerning all the surrounding information acquisition sensors that the vehicle 130 has. Therefore, the surrounding information transmission unit 203 may transmit only surrounding information acquired by the surrounding information acquisition sensors for which the accuracy information greater than a predetermined threshold is prescribed. In this case, the surrounding information transmission unit 203 functions as a determination unit that determines whether surrounding information acquired by a surrounding information acquisition sensor has accuracy higher than a predetermined threshold. The surrounding information transmission unit 203 also functions as a transmission unit that transmits surrounding information to the vehicle management server 110 if the surrounding information transmission unit 203 has determined that the surrounding information acquired by a surrounding information acquisition sensor has accuracy higher than the predetermined threshold. Note that the "predetermined threshold"

may be previously set in the surrounding information acquisition apparatus 142, or may be set in response to an instruction sent from the vehicle management server 110.

[Variant No. 3]

In the above-mentioned embodiment, the comparison unit 704 determines whether to send the determination result to the transmission requesting unit 705 using the contribution degree lowest value calculated based on the time information and the accuracy information of the surrounding information stored in the dynamic map information storage unit 122 as a threshold. However, the threshold to determine whether to send the determination result to the transmission requesting unit 705 is not limited to the contribution degree lowest value. The threshold to determine whether to send the determination result to the transmission requesting unit 705 may be any value calculated based on the time information and the accuracy information of the surrounding information stored in the dynamic map information storage unit 122 and suitable to collect the surrounding information that will contribute to creation and update of the dynamic map information storage unit 112.

In the above-mentioned embodiment, the dynamic map information storage unit 122 is included in the information management server 120, and the information management server 120 functions as the information management unit 121. However, the dynamic map information storage unit 122 need not be included in the information management server 120 that is a storage unit different from the vehicle management server 110. For example, the dynamic map information storage unit 122 may be included in a storage unit in the vehicle management server 110. In this case, the vehicle management server 110 functions as the contribution determination unit 111 and the information management unit 121.

Also, in the above-mentioned embodiment, the time information that indicates the time when the surrounding information detected by a surrounding information acquisition sensor is recorded in the surrounding information recording unit 205 is stored in the dynamic map information storage unit 122. However, the time information stored in the dynamic map information storage unit 122 is not limited to the above-mentioned time information. For example, if the attribution information transmission unit 202 transmits the attribution information to the vehicle management server 110 immediately after the detected surrounding information is recorded in the surrounding information recording unit 205, the time information that indicates the time when the vehicle management server 110 receives the attribution information may be stored in the dynamic map information storage unit 122.

Also, in the above-mentioned embodiment, "0" is substituted for the "elapsed time from when surrounding information was acquired" when the contribution calculation unit 703 of the vehicle management server 110 calculates the contribution degree. However, there may be a case where, after a certain time has elapsed since the surrounding information acquisition unit 201 acquired the surrounding information, the attribution information transmission unit 202 transmits the attribution information. Therefore, the contribution calculation unit 703 of the vehicle management server 110 may calculate the contribution degree in the same calculation method as the method in which the contribution degree lowest value calculation unit 902 of the information management server 120 calculates the contribution degree. That is, also when the contribution calculation unit 703 of the vehicle management server 110 calculates the contribution degree, the difference between the time when the calculation is carried out and the time information included in the attribution information may be used to substitute for the "elapsed time from when surrounding information was acquired".

Also, in the above-mentioned embodiment, the contribution calculation unit 703 calculates the contribution degree if the contribution calculation unit 703 has determined that the number-of-stored-sets determination unit 702 of the vehicle management server 110 is greater than or equal to the predetermined number. However, the contribution calculation unit 703 may calculate the contribution degree without regard to whether the contribution calculation unit 703 has determined that the number-of-stored-sets determination unit 702 of the vehicle management server 110 is greater than or equal to the predetermined number. This is because, even if the number of stored sets is small, it is possible to further reduce the communications traffic by excluding surrounding information that has a low contribution degree from the targets to be collected.

What is claimed is:

1. A server comprising circuitry configured to:
   request a vehicle to transmit additional surrounding information when a number of stored sets of stored surrounding information is less than a predetermined number, the vehicle acquiring the additional surrounding information having an accuracy greater than a threshold calculated based on accuracy of the stored sets of surrounding information, accuracy of surrounding information being determined according to a type of a sensor that detects the surrounding information;
   in response to the number of stored sets of surrounding information being greater than or equal to the predetermined number, calculate a serviceability with respect to the additional surrounding information and a serviceability lowest value with respect to the stored set of surrounding information;
   in response to the serviceability being greater than the serviceability lowest value, request the vehicle to transmit the additional surrounding information; and
   store the additional surrounding information transmitted from the vehicle in response to the requesting.

2. The server according to claim 1, wherein
   the vehicle has a plural types of sensors configured to detect surrounding information, and
   accuracy of surrounding information is determined according to which one of the plural types of sensors detects the surrounding information.

3. The server according to claim 1, wherein
   the circuitry is further configured to calculate the threshold using serviceability acquired from reducing, according to an elapsed time from when surrounding information has been acquired by a vehicle, serviceability of the surrounding information determined depending on accuracy of the surrounding information.

4. The server according to claim 1, wherein
   the circuitry is further configured to determine whether the number of stored sets of surrounding information is less than the predetermined number.

5. The server according to claim 1, wherein
   the circuitry is further configured to increase a score of a user of the vehicle that transmits the additional surrounding information in response to the request so that an incentive according to the score is given to the user.

6. The server according to claim 1, wherein
   the circuitry is further configured to
   receive the accuracy of the additional surrounding information that the vehicle acquires, and determine whether the received accuracy is greater than the threshold, the vehicle acquiring the additional surrounding information that is one for which the accuracy is determined to be greater than the threshold.

7. A surrounding information collecting method performed by circuitry, the surrounding information collecting method comprising:

requesting a vehicle to transmit additional surrounding information when a number of stored sets of stored surrounding information is less than a predetermined number, the vehicle acquiring the additional surrounding information having an accuracy greater than a threshold calculated based on accuracy of the stored sets of surrounding information, accuracy of surrounding information being determined according to a type of a sensor that detects the surrounding information;

in response to the number of stored sets of surrounding information being greater than or equal to the predetermined number, calculating a serviceability with respect to the additional surrounding information and a serviceability lowest value with respect to the stored set of surrounding information;

in response to the serviceability being greater than the serviceability lowest value, requesting the vehicle to transmit the additional surrounding information; and storing the additional surrounding information transmitted from the vehicle in response to the requesting.

8. The surrounding information collecting method according to claim 7, wherein the vehicle has a plural types of sensors configured to detect surrounding information, and accuracy of surrounding information is determined according to which one of the plural types of sensors detects the surrounding information.

9. The surrounding information collecting method according to claim 7, further comprising calculating the threshold using serviceability acquired from reducing, according to an elapsed time from when surrounding information has been acquired by a vehicle, serviceability of the surrounding information determined depending on accuracy of the surrounding information.

10. The surrounding information collecting method according to claim 7, further comprising determining whether the number of stored sets of surrounding information is less than the predetermined number.

11. The surrounding information collecting method according to claim 7, further comprising increasing a score of a user of the vehicle that transmits the additional surrounding information in response to the request so that an incentive according to the score is given to the user.

12. The surrounding information collecting method according to claim 7, further comprising:

receiving the accuracy of the additional surrounding information that the vehicle acquires, and determining whether the received accuracy is greater than the threshold, the vehicle acquiring the additional surrounding information that is one for which the accuracy is determined to be greater than the threshold.

13. A non-transitory recording medium storing a program which, when being executed by one or more processors, causes the one or more processors to:

request a vehicle to transmit additional surrounding information when a number of stored sets of stored surrounding information is less than a predetermined number, the vehicle acquiring the additional surrounding information having an accuracy greater than a threshold calculated based on accuracy of the stored sets of surrounding information, accuracy of surrounding information being determined according to a type of a sensor that detects the surrounding information;

in response to the number of stored sets of surrounding information being greater than or equal to the predetermined number, calculate a serviceability with respect to the additional surrounding information and a serviceability lowest value with respect to the stored set of surrounding information;

in response to the serviceability being greater than the serviceability lowest value, request the vehicle to transmit the additional surrounding information; and store the additional surrounding information transmitted from the vehicle in response to the requesting.

14. The non-transitory recording medium according to claim 13, wherein the vehicle has a plural types of sensors configured to detect surrounding information, and accuracy of surrounding information is determined according to which one of the plural types of sensors detects the surrounding information.

15. The non-transitory recording medium according to claim 13, storing the program which, when being executed by the one or more processors, further causes the one or more processors to calculate the threshold using serviceability acquired from reducing, according to an elapsed time from when surrounding information has been acquired by a vehicle, serviceability of the surrounding information determined depending on accuracy of the surrounding information.

16. The non-transitory recording medium according to claim 13, storing the program which, when being executed by the one or more processors, further causes the one or more processors to determine whether the number of stored sets of surrounding information is less than the predetermined number.

17. The non-transitory recording medium according to claim 13, storing the program which, when being executed by the one or more processors, further causes the one or more processors to increase a score of a user of the vehicle that transmits the additional surrounding information in response to the request so that an incentive according to the score is given to the user.

18. The non-transitory recording medium according to claim 13, storing the program which, when being executed by the one or more processors, further causes the one or more processors to:

receive the accuracy of the additional surrounding information that the vehicle acquires, and determine whether the received accuracy is greater than the threshold, the vehicle acquiring the additional surrounding information which is one for which the accuracy is determined to be greater than the threshold.

* * * * *